US012573731B2

(12) United States Patent
Choi et al.

(10) Patent No.: US 12,573,731 B2
(45) Date of Patent: Mar. 10, 2026

(54) CYLINDRICAL BATTERY CELL, BATTERY PACK, VEHICLE AND CURRENT COLLECTOR PLATE

(71) Applicant: LG ENERGY SOLUTION, LTD., Seoul (KR)

(72) Inventors: Jin-Yi Choi, Daejeon (KR); Duk-Hyun Ryu, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 256 days.

(21) Appl. No.: 18/564,995

(22) PCT Filed: Oct. 28, 2022

(86) PCT No.: PCT/KR2022/016747
§ 371 (c)(1),
(2) Date: Nov. 28, 2023

(87) PCT Pub. No.: WO2023/075523
PCT Pub. Date: May 4, 2023

(65) Prior Publication Data
US 2024/0258664 A1 Aug. 1, 2024

(30) Foreign Application Priority Data

Oct. 29, 2021 (KR) ........................ 10-2021-0147347
Jan. 27, 2022 (KR) ........................ 10-2022-0012575
Jul. 19, 2022 (KR) ........................ 10-2022-0089234

(51) Int. Cl.
*H01M 50/586* (2021.01)
*H01M 10/04* (2006.01)
(Continued)

(52) U.S. Cl.
CPC ..... *H01M 50/586* (2021.01); *H01M 10/0431* (2013.01); *H01M 50/107* (2021.01);
(Continued)

(58) Field of Classification Search
None
See application file for complete search history.

(56) References Cited

U.S. PATENT DOCUMENTS

| | | | |
|---|---|---|---|
| 4,879,187 A | 11/1989 | Biegger | |
| 6,677,082 B2 | 1/2004 | Thackeray et al. | |
| (Continued) | | | |

FOREIGN PATENT DOCUMENTS

| | | | |
|---|---|---|---|
| CN | 1495943 A | 5/2004 | |
| CN | 103500844 A | 1/2014 | |
| (Continued) | | | |

OTHER PUBLICATIONS

Japanese Office Action issued in Japan Application No. 2024-502541, dated Apr. 1, 2025.
(Continued)

*Primary Examiner* — Wyatt P McConnell
(74) *Attorney, Agent, or Firm* — Birch, Stewart, Kolasch & Birch, LLP

(57) ABSTRACT

A cylindrical battery cell, a battery pack and a vehicle including the same are provided. The cylindrical battery cell includes an electrode assembly having a first electrode plate and a second electrode plate wound in one direction with a separator being interposed therebetween, the first electrode plate including a first uncoated region in which an active material layer is not coated at an end of a long side, the first uncoated region providing a plurality of winding turns with respect to a center of the electrode assembly; a battery can having an open portion and a partial closed portion provided at a side opposite of the open portion; a current collector plate electrically connected to the first uncoated region of the first electrode plate and having a fusing portion that is cut off when an overcurrent flows; and a cell terminal.

52 Claims, 15 Drawing Sheets

10

400

200

240

(51) Int. Cl.

| | |
|---|---|
| *H01M 50/107* | (2021.01) |
| *H01M 50/249* | (2021.01) |
| *H01M 50/583* | (2021.01) |
| *H01M 50/595* | (2021.01) |

(52) U.S. Cl.
CPC ....... *H01M 50/249* (2021.01); *H01M 50/583* (2021.01); *H01M 50/595* (2021.01); *H01M 2220/20* (2013.01)

(56) References Cited

U.S. PATENT DOCUMENTS

| | | | |
|---|---|---|---|
| 6,680,143 B2 | 1/2004 | Thackeray et al. | |
| 2004/0023107 A1 | 2/2004 | Nakanishi et al. | |
| 2004/0126650 A1 | 7/2004 | Kim | |
| 2006/0024572 A1 | 2/2006 | Lee | |
| 2008/0131767 A1 | 6/2008 | Kim | |
| 2010/0216001 A1* | 8/2010 | Byun ................. | H01M 50/538 |
| | | | 429/185 |
| 2011/0076547 A1 | 3/2011 | Shin | |
| 2011/0177387 A1 | 7/2011 | Byun et al. | |
| 2011/0256433 A1 | 10/2011 | Fuhr et al. | |
| 2011/0300419 A1 | 12/2011 | Byun | |
| 2013/0040176 A1 | 2/2013 | Tyler et al. | |
| 2013/0288088 A1 | 10/2013 | Byun | |
| 2014/0113185 A1 | 4/2014 | Mori et al. | |
| 2019/0386272 A1 | 12/2019 | Shin et al. | |
| 2021/0043915 A1 | 2/2021 | Mantoku et al. | |
| 2024/0258664 A1 | 8/2024 | Choi et al. | |

FOREIGN PATENT DOCUMENTS

| | | | |
|---|---|---|---|
| CN | 103797611 A | 5/2014 |
| CN | 206564281 U | 10/2017 |
| CN | 112909445 A | 6/2021 |
| CN | 113346201 A | 9/2021 |
| CN | 215578629 U | 1/2022 |
| CN | 116073038 A | 5/2023 |
| JP | 11-135151 A | 5/1999 |
| JP | 3468538 B2 | 11/2003 |
| JP | 3960877 B2 | 8/2007 |
| JP | 2011-77105 A | 4/2011 |
| KR | 10-0599749 B1 | 7/2006 |
| KR | 10-0599793 B1 | 7/2006 |
| KR | 10-0814853 B1 | 3/2008 |
| KR | 10-1165503 B1 | 7/2012 |
| KR | 10-1233601 B1 | 2/2013 |
| KR | 10-1943675 B1 | 1/2019 |
| KR | 10-2019-0030016 A | 3/2019 |
| KR | 10-2022-0107132 A | 8/2022 |

OTHER PUBLICATIONS

Japanese Office Action issued in Japan Application No. 2024-502541, dated Jun. 24, 2025.
International Search Report (PCT/ISA/210) issued in PCT/KR2022/016747, dated Mar. 2, 2023.
Extended European Search Report for European Application No. 22887718.9, dated Jul. 11, 2025.
Machine translation of CN-113346201-A, published on Sep. 3, 2021.

\* cited by examiner

CYLINDRICAL BATTERY CELL, BATTERY PACK, VEHICLE AND CURRENT COLLECTOR PLATE

TECHNICAL FIELD

The present application claims priority to Korean Patent Application No. 10-2021-0147347 filed on Oct. 29, 2021, Korean Patent Application No. 10-2022-0012575 filed on Jan. 27, 2022, and Korean Patent Application No. 10-2022-0089234 filed on Jul. 19, 2022, in the Republic of Korea, the disclosures of which are incorporated herein by reference.

The present disclosure relates to a cylindrical battery cell and a battery pack and a vehicle comprising the same.

BACKGROUND ART

Due to their characteristics of being easily applicable to various products and electrical properties such as high energy density, secondary batteries are not only commonly applied to portable devices, but universally applied to electric vehicles (EVs) or hybrid electric vehicle (HEVs) that are driven by an electrical driving source.

Such secondary batteries are gaining attention for their primary advantage of remarkably reducing the use of fossil fuels and not generating by-products from the use of energy, making it a new eco-friendly and energy efficient source of energy.

The types of secondary batteries widely used at present include lithium ion batteries, lithium polymer batteries, nickel cadmium batteries, nickel hydrogen batteries, nickel zinc batteries or the like. This unit secondary battery cell has an operating voltage of about 2.5V to 4.5V.

Accordingly, when a higher output voltage is required, a plurality of battery cells may be connected in series to form a battery pack. Additionally, the battery pack may be fabricated by connecting the plurality of battery cells in parallel according to the charge/discharge capacity required for the battery pack. Accordingly, the number of battery cells included in the battery pack and the electrical connection type may be variously set depending on at least one of the required output voltage or charge/discharge capacity.

Meanwhile, the secondary battery cells include cylindrical, prismatic and pouch-type battery cells. A cylindrical battery cell is fabricated by winding a positive electrode and a negative electrode with an insulator or a separator interposed between to form a jelly-roll type electrode assembly, and inserting the jelly-roll type electrode assembly in a battery can together with an electrolyte.

Here, when the battery can is connected to the negative electrode or the positive electrode (typically, the negative electrode) and is polar, insulation between the battery can and the jelly-roll type electrode assembly is necessary.

Meanwhile, recently, as cylindrical battery cells are used in electric vehicles, the form factor of the cylindrical battery cells increases. That is, the diameter and height of the cylindrical battery cells increase compared to cylindrical battery cells with 18650, 21700 form factors. The increase in form factor leads to the increased energy density, enhanced safety against thermal runaway and improved cooling efficiency.

Here, as the form factor increases, the need to protect the cylindrical battery cell from an overcurrent also increases, and as an example, a fusing portion may be formed on the current collector plate. However, when the fusing portion is formed on the current collector plate, foreign substances generated when the fusing portion of the current collector plate is cut off by an overcurrent may flow into the jelly-roll-type electrode assembly. In this case, the separator may be damaged by foreign substances, an internal short circuit may occur due to the foreign substances.

DISCLOSURE

Technical Problem

The present disclosure is designed to solve the problems of the related art, and therefore the present disclosure is directed to providing a cylindrical battery cell, which may prevent foreign substances generated when a fusing portion is cut off from flowing into a jelly-roll type electrode assembly by appropriately adjusting the position of the fusing portion in a current collector plate, and a battery pack and a vehicle including the same.

The present disclosure is further directed to providing a battery pack fabricated using cylindrical battery cell having the improved structure and a vehicle comprising the same.

However, the technical problem of the present disclosure to be solved is not limited to the above-described problem, and these and other problems will be clearly understood by those skilled in the art from the following description.

Technical Solution

In one aspect of the present disclosure, there is provided a cylindrical battery cell, comprising: an electrode assembly having a first electrode plate and a second electrode plate, each having a sheet shape, being wound in one direction with a separator being interposed therebetween, the first electrode plate including a first uncoated region in which an active material layer is not coated at an end of a long side of the first electrode plate, the first uncoated region forming a plurality of winding turns with respect to a center of the electrode assembly and being exposed beyond the separator; a battery can having an open portion in which the electrode assembly is accommodated therein and a partial closed portion provided at a side opposite the open portion, the battery can being electrically connected to the second electrode plate, the partial closed portion having a through-hole; a current collector plate electrically connected to the first uncoated region of the first electrode plate and having a fusing portion that is configured to be cut off when an overcurrent flows; and a cell terminal connected to the current collector plate through the through-hole of the closed portion of the battery can.

Preferably, at least a part of a bottom surface of the cell terminal may include a flat portion parallel to an inner surface of the closed portion of the battery can, and the current collector plate may be coupled to the flat portion of the cell terminal.

Preferably, an end of the first uncoated region may be bent to define a coupling surface, and the current collector plate may be coupled to the coupling surface.

Preferably, the electrode assembly may include a welding target area along a radial direction of the electrode assembly, and the current collector plate may be coupled to the first uncoated region within the welding target area.

In an embodiment, the current collector plate may include a rim portion disposed at an upper portion of the electrode assembly; an uncoated region coupling portion configured to extend inward from the rim portion and coupled to the first uncoated region; a terminal coupling portion spaced apart from the uncoated region coupling portion and coupled to the cell terminal; and a connection portion configured to extend inward from the rim portion to be connected to the terminal coupling portion and having the fusing portion, wherein the fusing portion may have a large resistance compared to other regions under the condition that the same current flows.

Preferably, the rim portion may have a rim shape in which at least a part of an inner region is empty.

Preferably, the uncoated region coupling portion and the terminal coupling portion may be electrically connected by the rim portion.

Preferably, the terminal coupling portion may be located at a center of an inner space of the rim portion.

Preferably, the terminal coupling portion may have a diameter of 100% to 110% of the diameter of a hollow present in a core of the electrode assembly.

In an embodiment, the fusing portion may be at least one notching groove formed in the connection portion.

Preferably, the notching groove may be formed at an end in a width direction of the connection portion, an upper surface of the connection portion, or a lower surface of the connection portion.

Preferably, the notching groove may be formed to be recessed toward the inside of the connection portion in a direction to decrease a width or thickness of the connection portion stepwise or continuously.

Preferably, the fusing portion may have a minimum width of 0.5 mm to 4.0 mm.

In another embodiment, the fusing portion may be at least one through-hole formed in the connection portion.

Preferably, the through-hole may have a maximum width of 0.2 mm to 6 mm.

In still another embodiment, the fusing portion may be surrounded by a tape.

Preferably, the tape may contain a polyimide (PI) material.

Preferably, the fusing portion may be formed on the connection portion so as to be spaced apart from the center of the electrode assembly by a distance of 40% to 90% of a maximum radius thereof.

In an embodiment, at least a part of the first uncoated region may be divided into a plurality of segments along a winding direction of the electrode assembly.

Preferably, at least a part of the plurality of segments may be bent along a radial direction of the electrode assembly.

Preferably, at least a part of the plurality of segments may overlap in multiple layers along a radial direction of the electrode assembly.

In another embodiment, a remaining part of the plurality of segments may not be bent, and the fusing portion may deviate from the unbent segments among the plurality of segments and be positioned above the bent segment among the plurality of segments.

In still another embodiment, a remaining part of the plurality of segments may be cut, and the fusing portion may deviate from the cut segments among the plurality of seg- ments and be positioned above the bent segment among the plurality of segments.

Preferably, a welding pattern drawn by a welding bead formed on one surface of the terminal coupling portion of the current collector plate may be drawn in a form of surrounding a center of a bottom surface of the cell terminal.

Preferably, the welding pattern may be formed continu- ously or discontinuously.

Preferably, a tensile force of a welding portion formed between the terminal coupling portion of the current collec- tor plate and a bottom surface of the cell terminal may be 2 kgf or more.

Preferably, a converted diameter of the welding pattern drawn by the welding bead formed on one surface of the terminal coupling portion of the current collector plate may be 2 mm or more. The converted diameter means a diameter of a circle when the area of the welding pattern is converted to the area of the circle.

In an embodiment, the cylindrical battery cell may further comprise a cap plate configured to close the open portion of the battery can.

Preferably, the cap plate may be electrically separated from the electrode assembly and is nonpolar.

Preferably, the cell terminal may be coupled to the through-hole.

Preferably, the cylindrical battery cell may further com- prise an insulator interposed between the closed portion and the current collector plate.

Preferably, the insulator may include an insulating poly- mer material.

Preferably, the insulator may be made of an elastic material.

Preferably, the insulator may have a center hole with a preset diameter at a center.

Preferably, the insulator may have a thickness corre- sponding to a distance between an inner surface of the closed portion of the battery can and the current collector plate.

Preferably, an upper surface of the insulator may be in contact with an inner surface of the closed portion of the battery can, and a lower surface of the insulator may be in contact with an upper surface of the current collector plate.

In an embodiment, the cell terminal may include a ter- minal insertion portion, and the terminal insertion portion may be inserted into the battery can through the through- hole.

Preferably, the cell terminal may be fixed to the through- hole while riveting a lower edge of the terminal insertion portion toward an inner surface of an upper end of the battery can.

Preferably, a diameter of the center hole of the insulator may be equal to or larger than a diameter of the terminal insertion portion.

Preferably, the terminal insertion portion of the cell ter- minal may pass through the center hole of the insulator.

Preferably, the terminal insertion portion of the cell ter- minal may be electrically coupled to the current collector plate through the center hole of the insulator.

In an embodiment, the cylindrical battery cell may further comprise a sealing gasket between an edge of the cap plate and the open portion of the battery can, the battery can may include a beading portion in a region adjacent to the open portion, and the battery can may include a crimping portion extending and bent toward the an inside of the battery can to surround and fix the edge of the cap plate together with the sealing gasket.

Preferably, the crimping portion may be formed at a lower part of the battery can on a basis of placement of the battery can.

Preferably, the cap plate may include a vent notch con- figured to rupture when an internal pressure of the battery can is higher than a threshold.

Preferably, the vent notch may be formed on both surfaces of the cap plate, and may be formed in at least one of a continuous circular pattern, a discontinuous circular pattern and a linear pattern on the surface of the cap plate.

Preferably, the vent notch may be formed on a bottom of the battery can on a basis of placement of the battery can, and when the vent notch ruptures, gas in the battery can may be discharged through the bottom of the battery can.

In another embodiment, the cylindrical battery cell may further comprise a lower current collector plate coupled to a bottom of the electrode assembly.

Preferably, at least a part of an edge of the lower current collector plate may be electrically coupled to the beading portion, and at least a part of the remaining area except the edge may be electrically connected to a second uncoated region of the second electrode plate.

Preferably, at least a part of the edge of the lower current collector plate may be electrically coupled to a surface adjacent to the crimping portion among an upper surface and a lower surface of the beading portion.

Preferably, the lower current collector plate and the beading portion may be welded by a laser.

In another aspect of the present disclosure, there is also provided a battery pack comprising at least one cylindrical battery cell, and a vehicle comprising at least one battery pack.

In another aspect of the present disclosure, there is also provided a current collector plate, which electrically connects a cell terminal on a closed portion of a battery can of a cylindrical battery cell to an electrode assembly, the current collector plate comprising: a rim portion; an uncoated region coupling portion configured to extend inward from the rim portion and coupled to an uncoated region of the electrode assembly; a terminal coupling portion spaced apart from the uncoated region coupling portion; and a connection portion configured to extend inward from the rim portion and be connected to the terminal coupling portion; and a fusing portion located on the connection portion and having a large resistance compared to other regions under the condition that the same current is applied.

Advantageous Effects

According to one aspect of the present disclosure, by appropriately adjusting the position of the fusing portion in the current collector plate, it is possible to prevent foreign substances generated when the fusing portion is cut off from flowing into the jelly-roll-type electrode assembly.

According to another aspect of the present disclosure, it is possible to provide a battery pack with improved capacity fabricated using the cylindrical battery cell having the improved structure and a vehicle comprising the same.

DESCRIPTION OF DRAWINGS

FIG. 5 is a plan view of a current collector plate in the cylindrical battery cell according to an embodiment of the present disclosure.

FIG. 6 is a modified embodiment of one side of the current collector plate of FIG. 5.

FIG. 7 is a modified embodiment of another side of the current collector plate of FIG. 5.

FIG. 10 is a diagram showing the definition of width, height and pitch of segments according to FIG. 9.

FIG. 12 is a diagram showing the definition of width, height and pitch of segments according to FIG. 11.

BEST MODE

Figure 1:
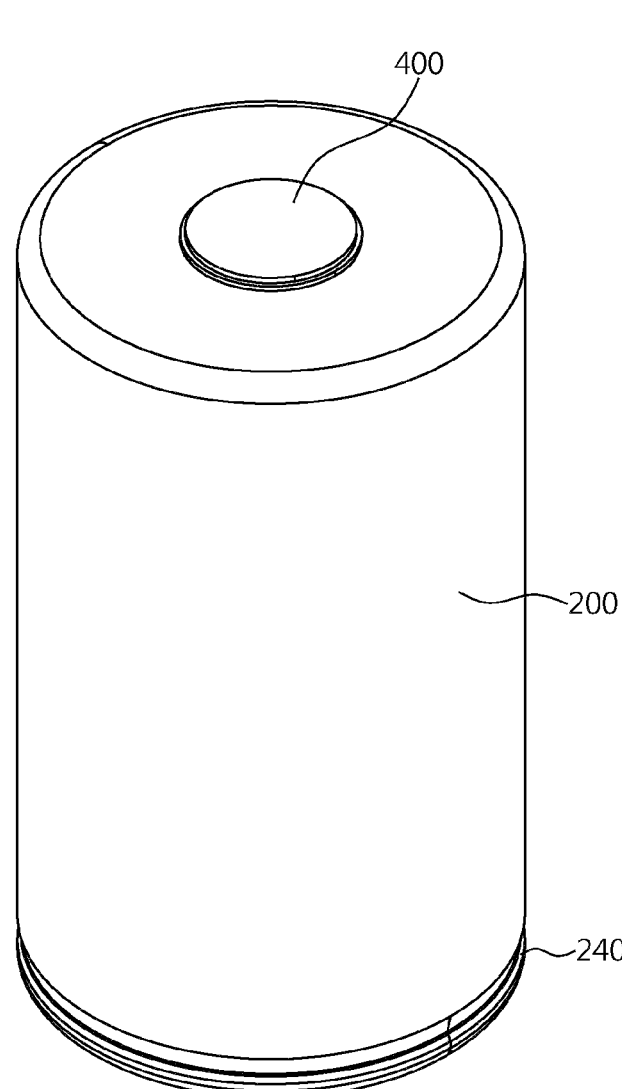
FIG. 1 is a perspective view of a cylindrical battery cell according to an embodiment of the present disclosure.

Hereinafter, exemplary embodiments of the present disclosure will be described in detail with reference to the accompanying drawings. Prior to the description, it should be understood that the terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation.

Therefore, the embodiments described herein and illustrations shown in the drawings are just an exemplary embodiment of the present disclosure, but not intended to fully describe the technical aspects of the present disclosure, so it should be understood that a variety of other equivalents and modifications could have been made thereto at the time that the application was filed.

Additionally, to help the understanding of the present disclosure, the accompanying drawings may show some elements in the exaggerated size, not in the actual size. Additionally, like reference numerals may be added to like elements in different embodiments.

Figure 2:
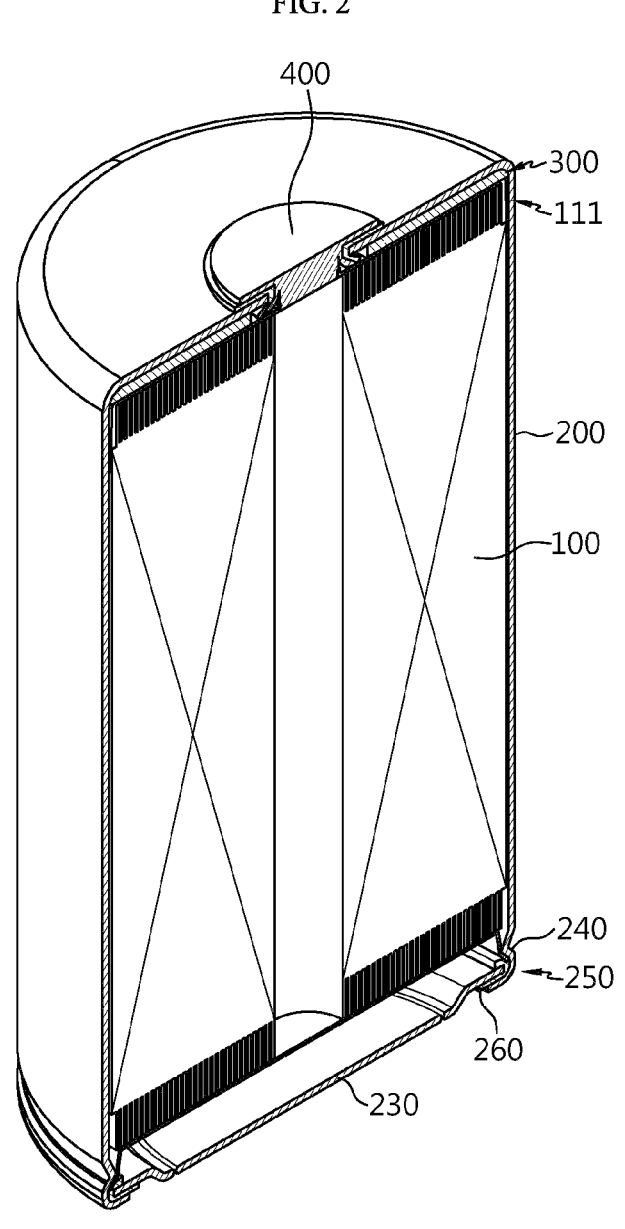
FIG. 2 is a cross-sectional perspective view showing a cross section of a center portion of the cylindrical battery cell in FIG. 1.
Figure 3:
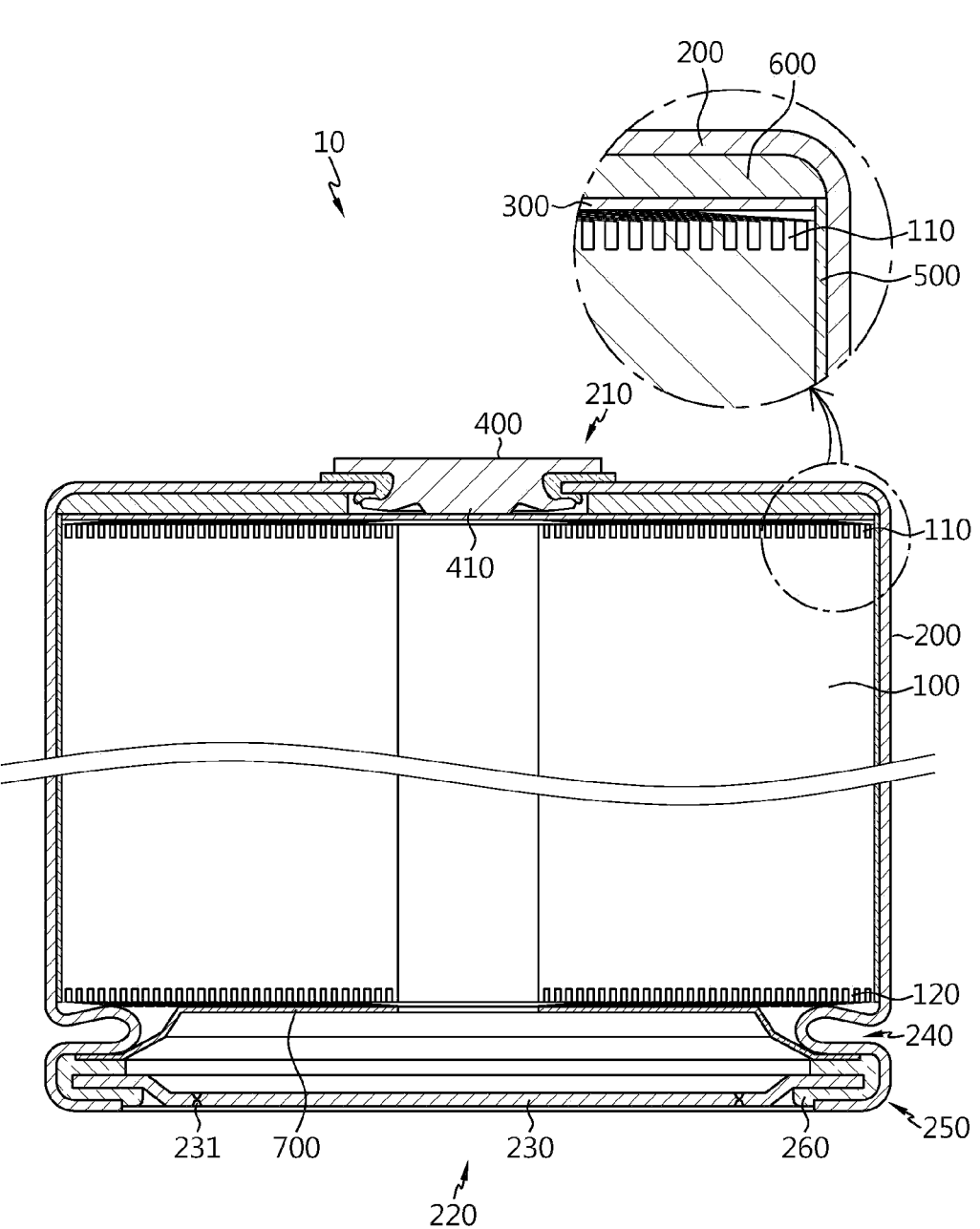
FIG. 3 is a cross-sectional view of a cylindrical battery cell according to an embodiment of the present disclosure.
Figure 4:
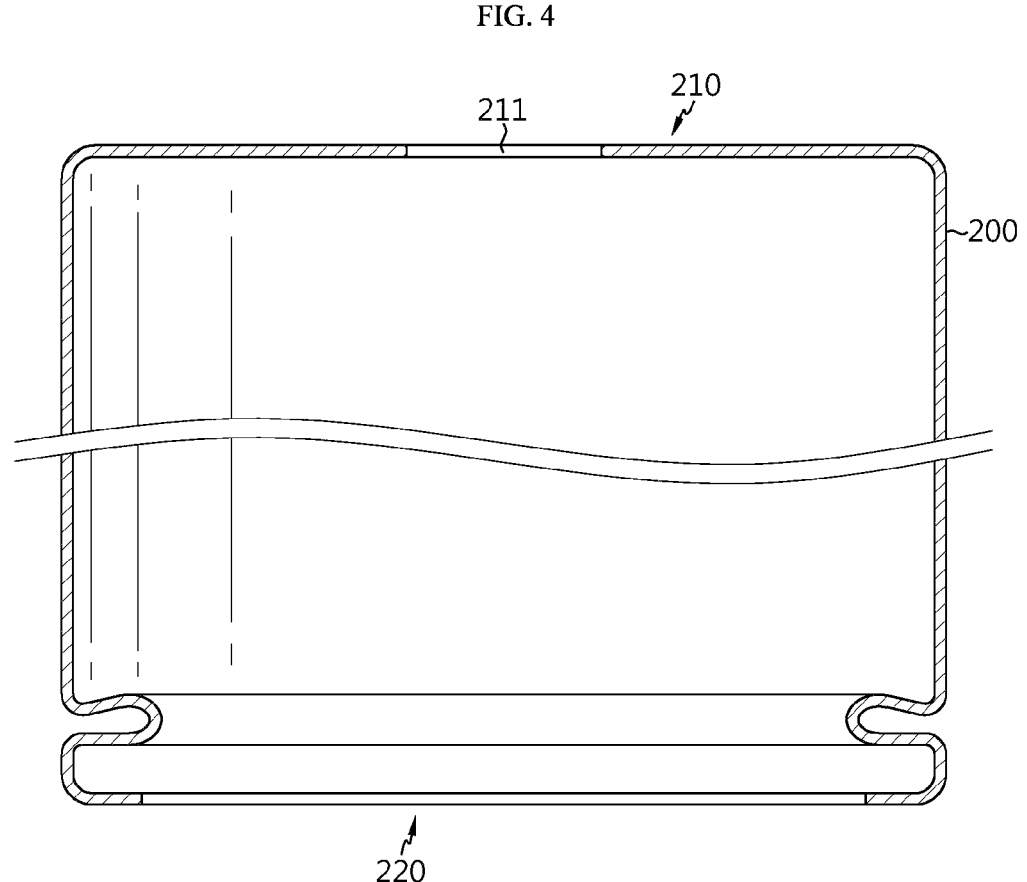
FIG. 4 is a diagram showing a battery can in a cylindrical battery cell according to an embodiment of the present disclosure.
Figure 5:
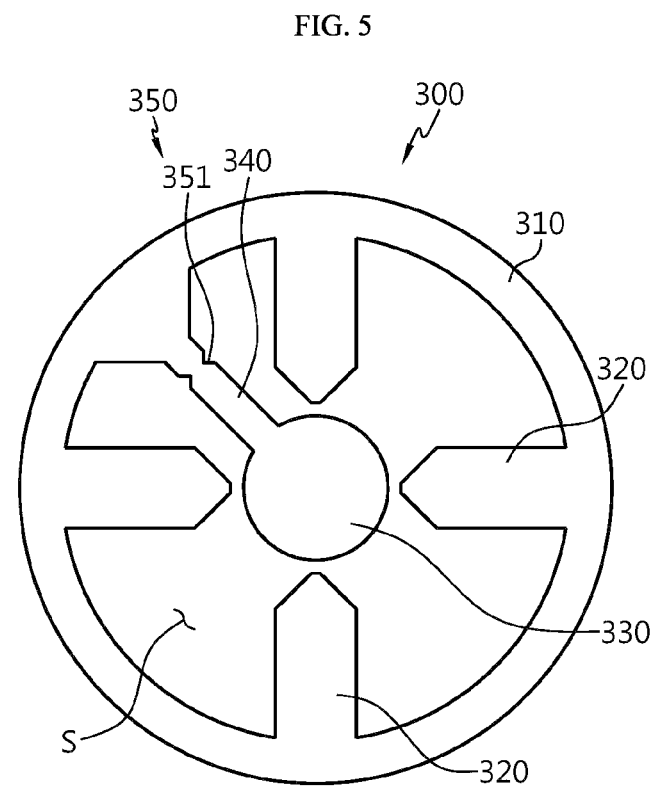
Figure 6:
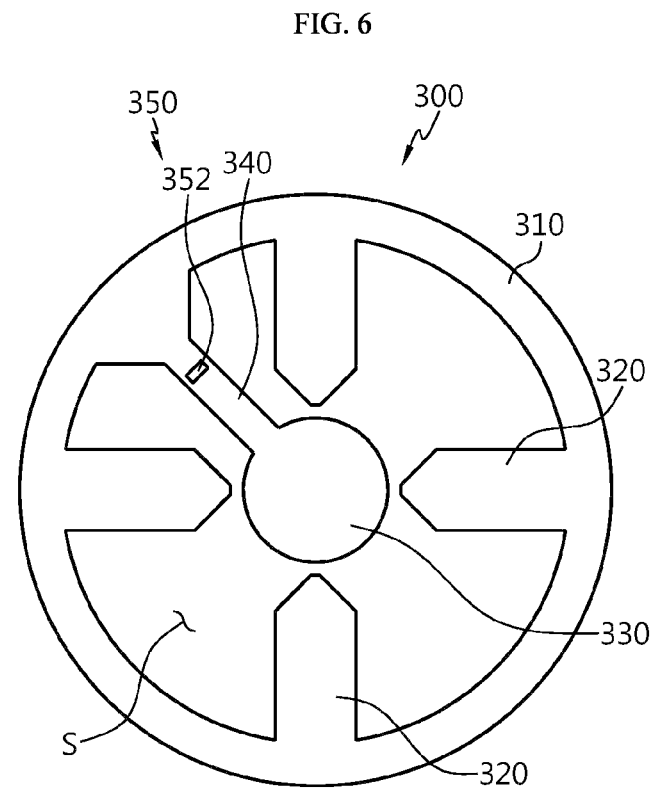
Figure 7:
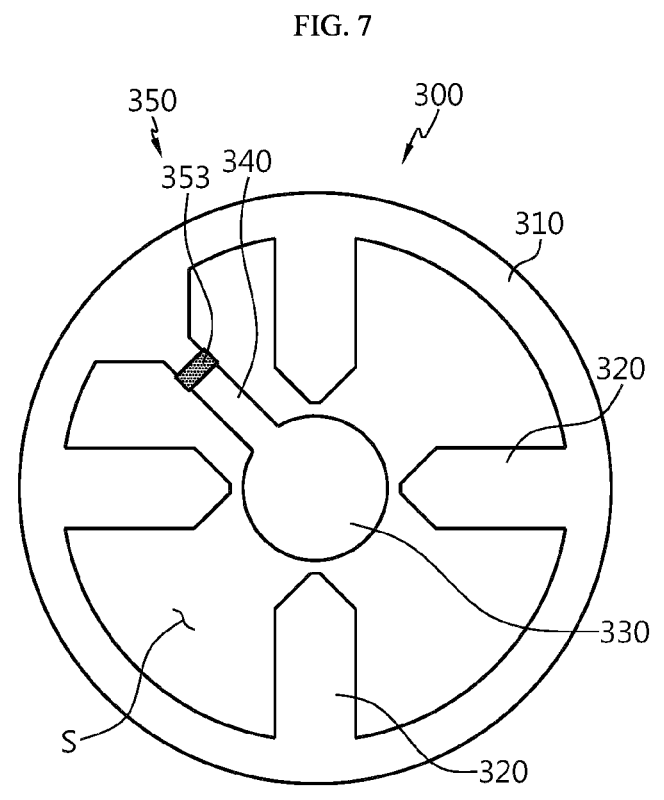
Figure 8:
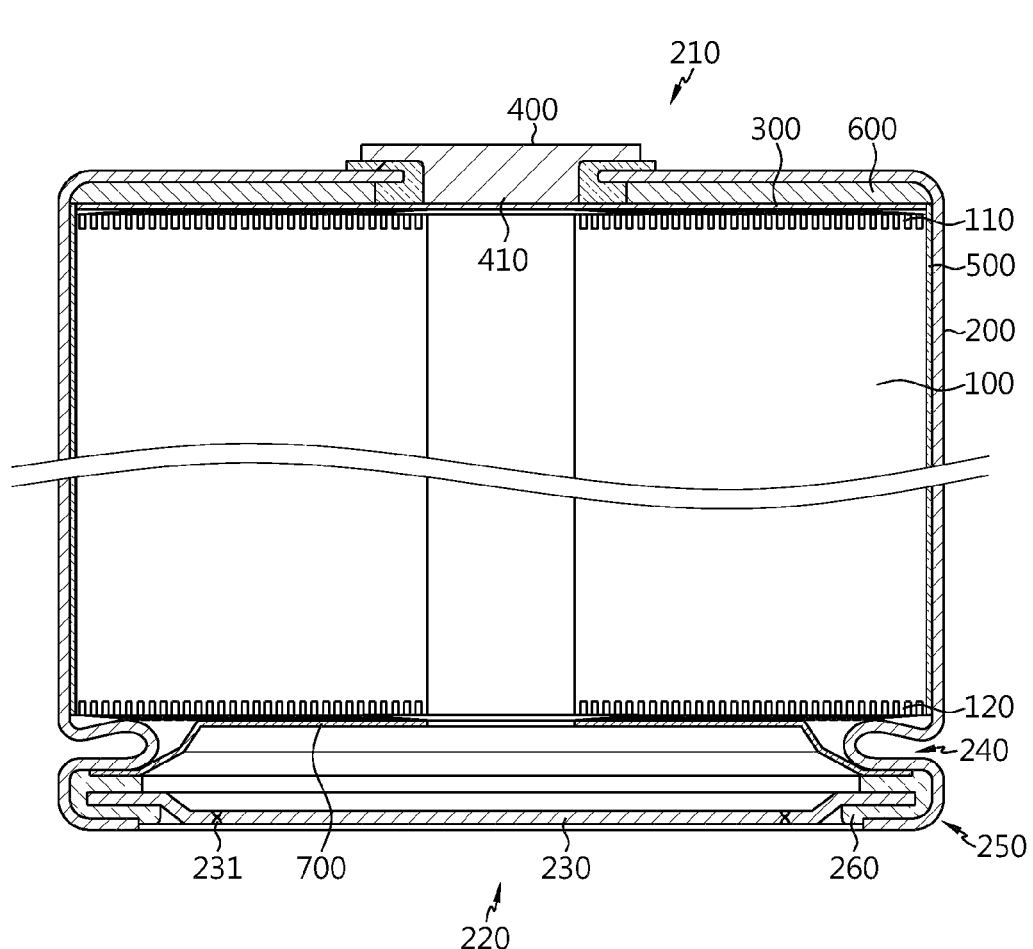
FIG. 8 is a cross-sectional view of another embodiment of the cylindrical battery cell of FIG. 3.

FIG. 1 is a perspective view of a cylindrical battery cell according to an embodiment of the present disclosure, FIG. 2 is a cross-sectional perspective view showing a cross section of a center portion of the cylindrical battery cell in FIG. 1, FIG. 3 is a cross-sectional view of a cylindrical battery cell according to an embodiment of the present disclosure, FIG. 4 is a diagram showing a battery can in a cylindrical battery cell according to an embodiment of the present disclosure, FIG. 5 is a plan view of a current collector plate in the cylindrical battery cell according to an embodiment of the present disclosure, FIG. 6 is a modified embodiment of one side of the current collector plate of FIG. 5, FIG. 7 is a modified embodiment of another side of the current collector plate of FIG. 5, and FIG. 8 is a cross-sectional view of another embodiment of the cylindrical battery cell of FIG. 3.

A cylindrical battery cell 10 according to an embodiment of the present disclosure will be described with reference to the drawings.

Preferably, the cylindrical battery cell 10 may be, for example, a cylindrical battery cell 10 of which a ratio of form factor (a value obtained by dividing the diameter of the cylindrical battery cell by its height, i.e., defined as a ratio of diameter Φ to height H) is larger than approximately 0.4.

Here, the form factor refers to a value indicating the diameter and height of the cylindrical battery cell 10. The cylindrical battery cell 10 according to an embodiment of the present disclosure may be, for example, 46110 cell, 48750 cell, 48110 cell, 48800 cell, 46800 cell. In the value indicating the form factor, the former two numbers indicate the diameter of the cell, the next two numbers indicate the height of the cell, and the last number 0 indicates that the cross section of the cell is circular. When the height of the cell exceeds 100 mm, the last digit 0 can be omitted because a 3-digit number is needed to indicate the height of the cell.

The battery cell according to an embodiment of the present disclosure may be a cylindrical battery cell 10 having an approximately cylindrical shape with the diameter of approximately 46 mm, the height of approximately 110 mm, and the ratio of form factor of 0.418.

The battery cell according to another embodiment may be a cylindrical battery cell having an approximately cylindrical shape with the diameter of approximately 48 mm, the height of approximately 75 mm, and the ratio of form factor of 0.640.

The battery cell according to another embodiment may be a cylindrical battery cell 10 having an approximately cylindrical shape with the diameter of approximately 48 mm, the height of approximately 110 mm, and the ratio of form factor of 0.436.

The battery cell according to another embodiment may be a cylindrical battery cell 10 having an approximately cylindrical shape with the diameter of approximately 48 mm, the height of approximately 80 mm, and the ratio of form factor of 0.600.

The battery cell according to another embodiment may be a cylindrical battery cell 10 having an approximately cylindrical shape with the diameter of approximately 46 mm, the height of approximately 80 mm, and the ratio of form factor of 0.575.

Battery cells having the ratio of form factor of approximately 0.4 or less have been used. That is, for example, 18650 cell and 21700 cell have been used. In the case of 18650 cell, the diameter is approximately 18 mm, the height is approximately 65 mm, and the ratio of form factor is 0.277. In the case of 21700 cell, the diameter is approximately 21 mm, the height is approximately 70 mm, and the ratio of form factor is 0.300.

Referring to FIGS. 2 and 3, the cylindrical battery cell 10 according to an embodiment of the present disclosure includes the electrode assembly 100, the cylindrical battery can 200, the current collector plate 300 and a cell terminal 400.

The electrode assembly 100 is configured in a jelly-roll type having a structure in which a first electrode plate and a second electrode plate having a sheet shape, and a separator interposed therebetween are wound in one direction.

Referring to FIG. 3, the first electrode plate includes a first uncoated region 110 in which an active material layer is not coated at an end of the long side. In addition, the second electrode plate may also include a second uncoated region 120 in which an active material layer is not coated at an end of the long side. That is, at least one of the first electrode plate and the second electrode plate may include an uncoated region in which the active material is not coated at the end of the long side in the winding direction.

Here, the first uncoated region 110 is exposed to the outside of the separator while forming a plurality of winding turns based on the center of the electrode assembly 100 and is used as an electrode tab by itself.

That is, the electrode assembly 100 is provided such that the first electrode plate and the second electrode plate having a sheet shape are wound in one direction with a separator interposed therebetween, where the first electrode plate may have a positive polarity or a negative polarity and the second electrode plate has a polarity opposite to that of the first electrode plate. That is, the first electrode plate may be a positive electrode plate or a negative electrode plate, and the second electrode plate may be a negative electrode plate or a positive electrode plate to have a polarity opposite to that of the first electrode plate. However, hereinafter, for convenience of explanation, the case where the first electrode plate is a positive electrode plate and the second electrode plate is a negative electrode plate will be mainly described.

The first electrode plate may be coated with a first electrode active material on one or two surfaces. Additionally, the first electrode plate includes the first uncoated region 110 in which the first electrode active material is not coated at the end thereof.

The second electrode plate is coated with a second electrode active material on one or two surfaces. Additionally, the second electrode plate includes the second uncoated region 120 in which the second electrode active material is not coated at the end thereof.

Additionally, the first uncoated region 110 of the first electrode plate and the second uncoated region 120 of the second electrode plate are provided in the opposite directions. The first uncoated region 110 is extended toward a closed portion 210 of the battery can 200, and the second uncoated region 120 is extended toward an open portion 220 of the battery can 200.

In the present disclosure, the positive electrode active material coated on the positive electrode plate and the negative electrode active material coated on the negative electrode plate may include, without limitation, any type of active material well-known in the corresponding technical field.

In an example, the positive electrode active material may include an alkali metal compound represented by formula $A[A_xM_y]O_{2+z}$ (A includes at least one of Li, Na or K; M includes at least one selected from Ni, Co, Mn, Ca, Mg, Al, Ti, Si, Fe, Mo, V, Zr, Zn, Cu, Al, Mo, Sc, Zr, Ru, and Cr; x≥0, 1≤x+y≤2, −0.1≤z≤2; the stoichiometric coefficients x, y and z are selected to keep the compound electrically neutral).

In another example, the positive electrode active material may be an alkali metal compound $xLiM^1O_2-(1-x)Li_2M^2O_3$ ($M^1$ includes at least one element having an average trivalent oxidation state; $M^2$ includes at least one element having an average tetravalent oxidation state; 0≤x≤1) disclosed by U.S. Pat. Nos. 6,677,082 and 6,680,143.

In still another example, the positive electrode active material may be lithium metal phosphate represented by formula $Li_aM^1_xFe_{1-x}M^2_yP_{1-y}M^3_zO_{4-z}$ ($M^1$ includes at least one selected from Ti, Si, Mn, Co, Fe, V, Cr, Mo, Ni, Nd, Mg and Al; $M^2$ includes at least one selected from Ti, Si, Mn, Co, Fe, V, Cr, Mo, Ni, Nd, Mg, Al, As, Sb, Si, Ge, V and S; M3 includes a halogen group element optionally including F; 0<a≤2, 0≤x≤1, 0≤y<1, 0≤z<1; the stoichiometric coefficients a, x, y and z are selected to keep the compound electrically neutral), or $Li_3M_2(PO_4)_3$ [M includes at least one selected from Ti, Si, Mn, Fe, Co, V, Cr, Mo, Ni, Mg and Al].

Preferably, the positive electrode active material may include primary particles and/or secondary particles formed by agglomeration of the primary particles.

In an example, the negative electrode active material may include a carbon material, lithium metal or a lithium metal compound, silicon or a silicon compound, tin or a tin compound. Metal oxide having the potential of less than 2V such as $TiO_2$ and $SnO_2$ may be used for the negative electrode active material. The carbon material may include low crystalline carbon and high crystalline carbon.

The separator may include a porous polymer film, for example, a porous polymer film made of a polyolefin-based polymer such as an ethylene homopolymer, a propylene homopolymer, an ethylene/butene copolymer, an ethylene/hexene copolymer and an ethylene/methacrylate copolymer, used singly or a stack of them. In another example, the separator may include a common porous nonwoven fabric, for example, a nonwoven fabric made of high melting point glass fibers and polyethylene terephthalate fibers.

The separator may have a coating layer of inorganic particles on at least one surface thereof. Additionally, the separator itself may be a coating layer of inorganic particles. The particles that form the coating layer may be bonded to each other with a binder to create interstitial volume between adjacent particles.

The inorganic particles may include inorganic particles having the dielectric constant of 5 or more. Non-limiting examples of the inorganic particles may include at least one material selected from the group consisting of $Pb(Zr,Ti)O_3$ (PZT), $Pb_{1-x}La_xZr_{1-y}Ti_yO_3$ (PLZT), $PB(Mg_3Nb_{2/3})O_3$—$PbTiO_3$ (PMN-PT), $BaTiO_3$, hafnia ($HfO_2$), $SrTiO_3$, $TiO_2$, $Al_2O_3$, $ZrO_2$, $SnO_2$, $CeO_2$, MgO, CaO, ZnO and $Y_2O_3$.

An electrolyte may be a salt having a structure such as $A^+B^-$. Here, $A^+$ includes an alkali metal cation such as $Li^+$, $Na^+$, $K^+$ or a combination thereof. Additionally, $B^-$ includes at least one anion selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The electrolyte may be used by dissolving in an organic solvent. The organic solvent may include at least one of propylene carbonate (PC), ethylenecarbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC) or γ-butyrolactone.

The battery can 200 is so cylindrical that the electrode assembly 100 is accommodated in the battery can 200 and is electrically connected to the second electrode plate of the electrode assembly 100. Accordingly, the battery can 200 may have the same polarity as the second electrode plate. That is, when the second electrode plate has a negative polarity, the battery can 200 also has a negative polarity.

When the size of the battery can 200 is set according to the preset standards, as the size of the electrode assembly 100 increases, the total capacity of the battery cells increases, but the gap between the battery can 200 and the electrode assembly 100 decreases.

That is, the gap between the battery can 200 and the electrode assembly 100 decreases with the increasing size of the electrode assembly 100 to increase the total capacity of the battery cells. To increase the capacity of the battery cells, the insulator 600 needs to be disposed in the reduced gap between the battery can 200 and the electrode assembly 100, and to this end, the thickness of the insulator 600 is preferably as small as possible.

Referring to FIG. 4, the battery can 200 may have the closed portion 210 and the open portion 220 opposite each other.

For example, on the basis of FIG. 4, the battery can 200 may have the open portion 220 on bottom. The electrode assembly 100 is accommodated through the open portion 220 on the bottom of the battery can 200, and the electrolyte is injected through the open portion 220 on the bottom of the battery can 200.

That is, the battery can 200 is an approximately cylindrical container having the open portion 220 on the bottom, and is made of, for example, a conductive material such as a metal. The battery can 200 may be made of a conductive metal, for example, aluminum, steel and stainless steel, but is not limited thereto. A Ni coating layer may be formed on the surface of the battery can 200.

Additionally, on the basis of FIG. 4, the battery can 200 may have the closed portion 210 on top. The closed portion 210 may have a through-hole 211, and the cell terminal 400 may be coupled to the through-hole 211 as shown in FIG. 3.

The insulator 600 is provided between the upper end of the electrode assembly 100 and the inner surface of the battery can 200 or between the current collector plate 300 coupled to the upper portion of the electrode assembly 100 and the inner surface of the closed portion 210 of the battery can 200. Referring to FIG. 3, the insulator 600 may be interposed between the closed portion 210 and the current collector plate 300. The insulator 600 prevents the current collector plate 300 and the battery can 200 from contacting each other. That is, the insulator 600 is accommodated in the battery can 200 and configured to cover at least a part of the electrode assembly 100 and block an electrical connection between the first uncoated region 110 and the battery can 200 or between the current collector plate 300 and the battery can 200. In addition, the insulator 600 may also be interposed between the upper end of the outer circumference of the electrode assembly 100 and the side wall of the battery can 200. That is, the insulator 600 may also be interposed between the first uncoated region 110 and the sidewall of the battery can 200. Alternatively, as described below, an insulating tape 500 may be coupled instead of the insulator 600 between the upper end of the outer circumference of the electrode assembly 100 and the sidewall of the battery can 200. Accordingly, the insulator 600 may be made of a material having an insulating property. For example, the insulator 600 may include, but is not limited to, an insulating polymer material. For example, the insulator 600 may be made of polyethylene terephthalate (PET), polybutylene terephthalate (PBT), or polypropylene (PP).

The insulator 600 may prevent contact between the current collector plate 300 and the battery can 200 and between the side surface of the first uncoated region 110 and the battery can 200 together with the insulating tape 500. That is, the insulator 600 may prevent contact between the current collector plate 300 and the battery can 200, and the insulating tape 500 may prevent contact between the side surface of the electrode assembly 100, namely the side surface of the first uncoated region 110, and the battery can 200. If there is no current collector plate 300, the insulator 600 may prevent contact between the upper side of the first uncoated region 110 and the battery can 200.

The insulator 600 may include, for example, an elastic material. Accordingly, when vibration or external impacts are applied to the cylindrical battery cell 10, the insulator 600 may absorb the impacts when it is restored to the original state by its elasticity after compressed. Accordingly, it is possible to minimize damage to the internal components of the battery cell when vibration or external impacts are applied to the battery cell.

The insulator 600 may have a center hole having a preset diameter at the center. For example, the insulator 600 may have an approximately circular center hole adjacent to the winding center. Due to the presence of the center hole, the cell terminal 400 may contact the current collector plate 300 or the first uncoated region 110. The terminal insertion portion 410 of the cell terminal 400 is coupled to the current collector plate 300 or the first uncoated region 110 through the center hole formed in the insulator 600. The center hole formed in the insulator 600 may be formed at a position corresponding to the hole formed at the winding center of the electrode assembly 100.

Meanwhile, when the welding portion between the cell terminal 400 and the terminal coupling portion 330 of the current collector plate 300 is located inside the hole formed at the winding center of the electrode assembly 100, there is a risk of damage to the electrode assembly 100. In order to prevent this, the flat portion formed at the lower end of the cell terminal 400 coupled to the terminal coupling portion 330 may be located at the same height as the lower surface of the insulator 600 or located higher. In this case, the welding portion between the cell terminal 400 and the current collector plate 300 is located at the outside of the hole formed at the winding center of the electrode assembly 100.

In consideration of this, the thickness of the insulator 600 may be equal to or larger than the distance from the inner surface of the closed portion 210 of the battery can 200 to the flat portion provided at the lower end of the cell terminal 400. Meanwhile, the insulator 600 may have a thickness corresponding to the distance between the inner surface of the closed portion 210 of the battery can 200 and the current collector plate 300 to fill the space between the inner surface of the closed portion 210 of the battery can 200 and the current collector plate 300 along the height direction so that a space for allowing the electrode assembly 100 to move up and down is not generated.

In another aspect, the upper surface of the insulator 600 may contact the inner surface of the closed portion 210 of the battery can 200, and the lower surface of the insulator 600 may contact the upper surface of the current collector plate 300.

The battery can 200 may include a beading portion 240 and a crimping portion 250 at the lower part. The beading portion 240 is formed by inward beading of the periphery of the outer circumferential surface of the battery can 200 in an area adjacent to the open portion 220 of the battery can 200.

The beading portion 240 may support the electrode assembly 100 to prevent the electrode assembly 100 having a size approximately corresponding to the width of the battery can 200 from slipping out of the open portion 220 formed on the bottom of the battery can 200, and act as a support on which a cap plate 230 is seated. Additionally, the beading portion 240 supports the outer circumferential surface of a sealing gasket 260. The beading portion 240 may be asymmetric with respect to an imaginary plane passing through the innermost point. The asymmetric shape is created in the sizing process of the battery can 200. The sizing process is a process of adjusting the height of the cell to the form factor by compressing the battery can 200 in the vertical direction.

The crimping portion 250 is extended and bent to the inner side of the battery can 200 to fix the cap plate 230 together with the sealing gasket 260 around the edge of the cap plate 230. Here, the crimping portion 250 is formed at the lower part of the battery can 200 on the basis of the placement of the battery can 200. For example, when the battery can 200 is positioned such that the cell terminal 400 is disposed at the upper part as shown in FIG. 3, the crimping portion 250 is formed at the lower part of the battery can 200 on the basis of FIG. 3. Additionally, as shown in FIG. 3 the crimping portion 250 is formed below the beading portion 240.

However, the present disclosure does not preclude the battery can 200 that does not include at least one of the beading portion 240 or the crimping portion 250. In the present disclosure, when the battery can 200 does not include at least one of the beading portion 240 or the crimping portion 250, the securing of the electrode assembly 100, the securing of the cap plate 230 or the sealing of the battery can 200 may be accomplished through at least one of additional application of a component that acts as a stopper for the electrode assembly 100, additional application of a structure on which the cap plate 230 is seated, or welding between the battery can 200 and the cap plate 230.

On the basis of FIG. 3, the crimping portion 250 is formed below the beading portion 240. The crimping portion 250 is extended and bent around the edge of the cap plate 230 disposed below the beading portion 240. By the bent shape of the crimping portion 250, the cap plate 230 is fixed above the beading portion 240. The crimping portion 250 may be omitted and any other securing structure may be used to fix the cap plate 230 that covers the open portion of the battery can 200. For example, the applicant's patent publication KR 10-2019-0030016 A discloses a cylindrical battery cell in which the beading portion is omitted, and this structure may be employed in the present disclosure.

The current collector plate 300 is electrically connected to the first electrode plate on the electrode assembly 100. That is, the current collector plate 300 electrically connects the cell terminal 400 on the closed portion 210 of the battery can 200 of the cylindrical battery cell 10 to the electrode assembly 100.

Referring to FIG. 5, a fusing portion 350 that is cut off when an overcurrent flows is formed in the current collector plate 300. The fusing portion 350 is formed on the connection portion 340, and is configured to have a greater resistance under the condition that the same current is applied as compared to other regions. The minimum width of the fusing portion may be 0.5 mm to 4.0 mm.

The current collector plate 300 is made of a conductive metal and is connected to the first uncoated region 110 of the electrode assembly 100.

The current collector plate 300 is coupled onto a coupling surface formed by bending the end of the first uncoated region 110 in a direction parallel to the current collector plate 300. The bent direction of the first uncoated region 110 may be, for example, a direction toward the winding center of the electrode assembly 100.

When the first uncoated region 110 has the bent shape as described above, the space occupied by the first uncoated region 110 reduces, leading to improved energy density. Additionally, the increased coupling area between the first uncoated region 110 and the current collector plate 300 may lead to the improved coupling strength and the reduced resistance.

Referring to FIG. 5, the current collector plate 300 may include a rim portion 310, an uncoated region coupling portion 320, a terminal coupling portion 330, and a connection portion 340.

The rim portion 310 is disposed on the upper portion of the electrode assembly and may have an approximately rim shape in which an inner space S is formed. FIG. 5 shows a case in which the rim portion 310 has a substantially circular rim shape, but the shape of the rim portion 310 is not limited thereto. The rim portion 310 may have a substantially rectangular rim shape, a hexagonal rim shape, an octagonal rim shape, or other shapes, unlike the shown one. The uncoated region coupling portion 320 and the terminal coupling portion 330 may be formed in the inner space of the rim portion 310. In addition, the uncoated region coupling portion 320 and the terminal coupling portion 330 may be electrically connected by the rim portion 310 and the connection portion 340. Here, the terminal coupling portion 330 may be located at the center of the inner space of the rim portion 310.

The uncoated region coupling portion 320 extends inward from the rim portion 310 and is coupled to the first uncoated region 110 of the electrode assembly 100. The uncoated region coupling portion 320 may be coupled to the first uncoated region 110 in various ways, for example, by welding such as laser welding, ultrasonic welding, or spot welding.

The uncoated region coupling portion 320 may be provided in plural. The plurality of uncoated region coupling portions 320 may be arranged at various intervals along the extending direction of the rim portion 310, and preferably may be arranged at the same intervals. The extension length of the plurality of uncoated region coupling portions 320 may be the same, but is not limited thereto. In this case, the plurality of uncoated region coupling portions 320 may be configured to surround the terminal coupling portion 330.

The terminal coupling portion 330 is spaced apart from the uncoated region coupling portion 320 with a space from the uncoated region coupling portion 320 and is located inside the rim portion 310. The terminal coupling portion 330 may be coupled to the cell terminal 400, explained later, by welding. Here, the terminal coupling portion 330 may be located at the center of the inner space S of the rim portion 310, for example. In addition, the terminal coupling portion 330 may be disposed at a position corresponding to the hole formed at the winding center of the electrode assembly 100. The terminal coupling portion 330 may have a diameter of 100% to 110% of the diameter of the hollow present in the core of the electrode assembly 100.

The uncoated region coupling portion 320 and the terminal coupling portion 330 are not directly connected, but are spaced apart from each other and electrically connected by the rim portion 310. As such, the current collector plate 300 according to an embodiment of the present disclosure have a structure in which the uncoated region coupling portion 320 and the terminal coupling portion 330 are not directly connected to each other but connected through the rim portion 310, so that, when an impact and/or vibration is generated at the cylindrical battery cell 10, the impact applied to the coupling portion between the uncoated region coupling portion 320 and the first uncoated region and the coupling portion between the terminal coupling portion 330 and the cell terminal 400 may be dispersed. Therefore, the current collector plate 300 of the present disclosure may minimize or prevent damage to the welding portion caused by external impacts.

That is, the current collector plate 300 has a structure in which stress can be concentrated on the connection portion of the rim portion 310 and the terminal coupling portion 330 when external impacts are applied. However, the welding portion for coupling components is not formed in this connection portion, it is possible to prevent product defects caused by damage to the welding portion due to external impacts.

The connection portion 340 extends inward from the rim portion 310 and is connected to the terminal coupling portion 330. The connection portion 340 may be located between a pair of uncoated region coupling portions 320 adjacent to each other. In this case, the distance from the connection portion 340 to any one of the pair of uncoated region coupling portions 320 in the extending direction of the rim portion 310 may be equal to the distance from the connection portion 340 to the other one of the pair of uncoated region coupling portions 320 in the extending direction of the rim portion 310.

In addition, although not shown in the drawings, the connection portion 340 may be provided in plural. Each of the plurality of connection portions 340 may be disposed between a pair of uncoated region coupling portions 320 adjacent to each other. The plurality of connection portions 340 may be disposed at the same intervals from each other along the extending direction of the rim portion 310.

Here, in the case where the uncoated region coupling portion 320 and/or the connection portion 340 is provided in plural, if the distance between the uncoated region coupling portions 320 and/or the distance between connection portions 340 and/or the distance between the uncoated region coupling portion 320 and the connection portion 340 is uniformly formed, a current from the uncoated region coupling portion 320 toward the connection portion 340 or a current from the connection portion 340 toward the uncoated region coupling portion 320 may be smoothly formed.

The width of at least a part of the connection portion 340 may be formed to be smaller than that of the uncoated region coupling portion 320, and the fusing portion 350 may be formed at one side of the connection portion 340. When the width of the connection portion is formed to be smaller than that of the uncoated region coupling portion 320, the electrical resistance in the connection portion 340 increases, and thus, when an overcurrent flows through the connection portion 340, the resistance increases and heat increases as compared to other portions. Here, since the fusing portion 350 is formed in the connection portion 340, when an overcurrent occurs so that heat increases in the connection portion 340, the fusing portion 350 ruptures to block the flow of the overcurrent.

Referring to FIG. 5, the fusing portion 350 may be at least one notching groove 351 formed in the connection portion 340. Since the resistance is inversely proportional to the area, if the notching groove 351 is formed in the connection portion 340 so that the area decreases in a region where the notching groove 351 is formed, the resistance increases in that region, and thus when the overcurrent flows, the heat is increased in the notching groove 351 to cause fracture. Here, the notching groove 351 may be formed on both ends of the connection portion 340 in the width direction, an upper surface of the connection portion 340 or a lower surface of the connection portion 340. Preferably, the notching groove 351 may be recessed toward the inside of the connection portion 340 in a direction to decrease the width or thickness of the connection portion 340 stepwise or continuously. Alternatively, the notching groove 351 may be formed in the thickness direction of the connection portion 340, instead of being formed on a plane.

As another embodiment, referring to FIG. 6, the fusing portion 350 may be at least one through-hole 352 formed in the connection portion 340. The through-hole 352 may have a maximum width of 0.2 mm to 6 mm. The detailed operation of the through-hole 352 is common to that of FIG. 5 and thus will not be described in detail again.

Referring to FIG. 7 as another embodiment, a tape 353 may be coupled to the fusing portion 350. If the tape 353 is coupled to the fusing portion 350 of the connection portion 340, when heat is generated in the connection portion 340, the heat dissipation is interrupted by the tape 353 so that the heat is not released, and thus the heat rises in the portion where the tape 353 is attached. In addition, rupture occurs due to the increased heat at the portion where the tape 353 is attached. Here, the tape 353 may be made of various materials, and, for example, may be made of polyimide (PI) that is not easily deformed by heat, but the material is not limited thereto.

As will be described later, at least a part of the first uncoated region 110 of the electrode assembly 100 may be divided into a plurality of segments 61, 61', and at least a part of the plurality of segments 61, 61' may be bent along a preset direction. Also, as the plurality of segments 61, 61' are bent, they may be configured to overlap in multiple layers. At this time, such that the other of the plurality of segments 61, 61' may be not bent, that is, some of the plurality of segments 61, 61' may be bent and the other may be maintained in a protruding shape along the winding axis direction without being bent. Alternatively, the remaining unbent segments among the plurality of segments 61, 61', namely the portion maintained in a protruding shape along the winding axis direction, may be cut.

When the plurality of segments 61, 61' are bent and overlapped in multiple layers, a gap is not formed between the plurality of overlapping segments 61, 61', so foreign substances generated when the fusing portion 350 of the current collector plate 300 is cut by an overcurrent do not flow into the jelly-roll type electrode assembly 100. However, if a part of the plurality of segments 61, 61' has a unbent shape that is maintained without being bent, or if the unbent portion of the plurality of segments 61, 61' is cut, a gap is formed in this region between the plurality of segments 61, 61', so foreign substances generated when the fusing portion 350 is cut may be introduced into the jelly-roll type electrode assembly 100. If foreign substances flow into the jelly-roll type electrode assembly 100, the separator may be damaged by the foreign substances, or an internal short circuit may occur due to the foreign substances.

The cylindrical battery cell 10 according to an embodiment of the present disclosure solves the above problem by appropriately adjusting the position of the fusing portion 350 formed in the connection portion 340. For example, the fusing portion 350 is configured to be located above the bent segments 61, 61' among the plurality of segments 61, 61' to be deviated from the unbent segments or the cut segments among the plurality of segments 61, 61'. According to this, even when the fusing portion 350 is cut to generate foreign substances, the foreign substances fall to the upper side of the bent segments 61, 61' among the plurality of segments 61, 61', and as described above. Thus, if the plurality of segments 61, 61' are bent and overlapped in multiple layers, a gap is not formed between the plurality of segments 61, 61', so that the foreign substances do not flow into the jelly-roll type electrode assembly 100. Accordingly, there is an effect of preventing damage to the separator and/or an internal short circuit by foreign substances. Preferably, the fusing portion 350 may be formed on the connection portion 340 to be spaced apart from the center of the electrode assembly 100 by a distance of 40% to 90% of its maximum radius.

The current collector plate 300 may be coupled with the terminal insertion portion 410 of the cell terminal 400. That is, a flat portion parallel to the inner surface of the closed portion 210 of the battery can 200 is formed on at least a part of the bottom surface of the terminal insertion portion 410 of the cell terminal 400, and the current collector plate 300 may be coupled with the flat portion of the cell terminal 400.

The electrode assembly 100 may include a welding target area in which the number of overlapping layers of the segments of the first uncoated region 110 is kept constant along a radial direction of the electrode assembly 100, and the current collector plate 300 may be coupled with the first uncoated region 100 within the welding target area. In this region, since the number of overlapping layers is kept to a maximum, it may be advantageous that the current collector plate 300, explained later, and the first uncoated region 110 are welded within this region. This is to prevent the laser beam from damaging the electrode assembly 100 by passing through the first uncoated region 110 when the output of the laser is increased to improve welding quality, in the case where laser welding is applied for example. In addition, this is to effectively prevent foreign substances such as welding spatter from flowing into the electrode assembly 100.

The electrical connection portion of the terminal insertion portion 410 may have, for example, a substantially cylindrical shape. Of course, the shape of the electrical connection portion of the terminal insertion portion 410 is not limited thereto. The electrical connection portion of the terminal insertion portion 410 may have various shapes, such as, for example, a cylindrical shape having an elliptical cross-section, a square pillar shape, a hexagonal pillar shape, or an octagonal pillar shape. A bottom surface of the electrical connection portion of the terminal insertion portion 410 may be formed to be substantially flat at least partially.

The bottom surface of the central region of the terminal insertion portion 410 and the current collector plate 300 may be coupled by, for example, laser welding, spot welding, or ultrasonic welding. Welding may be performed by irradiating a laser through a hole formed in the winding center of the electrode assembly 100 or inserting a tool for ultrasonic welding or spot welding to form a welding bead on one surface of the current collector plate 300 (a surface facing the hole formed in the winding center of the electrode assembly 100). A guide pipe (not shown) for welding may be inserted into the hole formed in the winding center. When welding is performed with the guide pipe inserted, it is possible to reduce the risk of damage to the separator that forms the inner wall of the hole formed in the winding center.

A welding pattern drawn by the welding bead formed on one surface of the terminal coupling portion 330 of the current collector plate 300 may be drawn in a form of surrounding the center of the bottom surface of the electrical connection portion of the terminal insertion portion 410. The welding pattern may be, for example, approximately circular, and alternatively, may have an approximately elliptical shape or a polygonal shape such as approximately a square, a hexagon, an octagon, and the like. The welding pattern formed by the welding bead may be formed continuously or discontinuously. Circles, ovals, polygons, or the like, which are examples of the shape of the welding pattern formed by the welding bead, do not mean a geometrically perfect circle, oval, polygon, or the like.

Meanwhile, the diameter of the flat portion formed on the bottom surface of the electrical connection portion of the terminal insertion portion 410 may be determined in consideration of welding strength with the current collector plate 300. The tensile force of the welding portion between the flat portion and the current collector plate 300 may be at least about 2 kgf or more, 5 kgf or more, 6 kgf or more, 7 kgf or more, 8 kgf or more, 9 kgf or more, or 10 kgf or more. It is desirable to increase the tensile force of the welding portion as much as possible within an allowable range by selecting a best welding method.

The diameter (or maximum width) of the welding pattern formed on the flat portion to satisfy the tensile force condition of the welding portion may be at least approximately 2 mm. When the area S of the welding bead appearing on the surface of the welding area is converted to an area of a circle ($\pi r^2$), the diameter of the welding pattern may be defined as a converted diameter ($2*(S/\pi)^{0.5}$) of the corresponding circle.

The flat portion formed on the bottom surface of the electrical connection portion of the terminal insertion portion 410 corresponds to a weldable region. The diameter of the weldable region may be approximately 3 mm to 14 mm. If the diameter of the weldable region is less than about 3 mm, it is difficult to secure a welding pattern with a diameter (converted diameter) of 2 mm or more. In particular, in the case of forming a welding pattern using laser welding, it is difficult to secure a welding pattern having a diameter of 2 mm or more due to laser beam interference. If the diameter of the weldable region exceeds approximately 14 mm, the diameter of the terminal exposing portion of the cell terminal 400 is inevitably increased more, and thus it becomes difficult to secure a sufficient area of the outer surface of the battery can 200 to be used as an electrode terminal having the opposite polarity to the cell terminal 400.

Considering the diameter condition of the welding pattern and the diameter condition of the weldable region, it is preferable that the ratio of the area of the welding pattern to the area of the weldable region required to secure a tensile force of the welding portion of at least about 2 kgf or more is approximately 2.04% ($\pi 1^2/\pi 7^2$) to 44.4% ($\pi 1^2/\pi 1.5^2$).

In one example, when the flat portion formed on the bottom surface of the electrical connection portion of the terminal insertion portion 410 and the current collector plate 300 are welded by a laser and the welding bead is welded while drawing a continuous or discontinuous line in the form of an approximately arc pattern, the diameter of the arc welding pattern is preferably about 2 mm or more, preferably about 4 mm or more. When the diameter of the arc welding pattern satisfies the corresponding condition, it is possible to secure sufficient welding strength by increasing the tensile force of the welding portion to about 2 kgf or more.

In another example, when the flat portion formed on the bottom surface of the electrical connection portion of the terminal insertion portion 410 and the current collector plate 300 are welded by ultrasonic waves and welded in a circular pattern, the diameter of the circular welding pattern is preferably about 2 mm or more. When the diameter of the circular welding pattern satisfies the corresponding condition, it is possible to secure sufficient welding strength by increasing the tensile force of the welding portion to about 2 kgf or more.

The diameter of the flat portion formed on the bottom surface of the cell terminal 400 corresponding to the weldable region may be adjusted in the range of approximately 3 mm to 14 mm. If the radius of the flat portion is less than about 3 mm, it is difficult to form a welding pattern having a diameter of about 2 mm or more using a laser welding tool, an ultrasonic welding tool, or the like.

Meanwhile, the cylindrical battery cell 10 according to an embodiment of the present disclosure has a structure in which the bottom surface of the electrical connection portion of the terminal insertion portion 410 is welded and coupled onto the current collector plate 300 as described above, and thus the coupling area between the current collector plate 300 and the cell terminal 400 may be maximized. That is, at least a part of the bottom surface of the electrical connection portion is formed to be flat, and thus the coupling area between the cell terminal 400 and the current collector plate 300 may be maximized. Therefore, the cylindrical battery cell 10 according to an embodiment of the present disclosure may ensure a smooth current flow at the coupling portion of the current collector plate 300 and the cell terminal 400 in the case where a large amount of current flows due to rapid charging, thereby reducing the charging time and reducing the amount of heat generated.

The current collector plate 300 is coupled to the upper portion of the electrode assembly 100. In addition, the current collector plate 300 is coupled to the cell terminal 400. That is, the current collector plate 300 timely connects the first uncoated region 110 of the electrode assembly 100 and the cell terminal 400. The current collector plate 300 is made of a conductive metal material and is connected to the first uncoated region 110. Although not shown in the drawings, the current collector plate 300 may include a plurality of irregularities radially formed on a lower surface thereof. When the irregularities are formed, the irregularities may be press-fitted into the first uncoated region 110 by pressing the current collector plate 300.

A flat portion approximately parallel to the inner surface of the closed portion 210 of the battery can 200 may be formed on at least a part of the bottom surface of the cell terminal 400, namely the bottom surface of the electrical connection portion of the terminal insertion portion 410, and the current collector plate 300 is coupled with the flat portion.

The current collector plate 300 is coupled to the end of the first uncoated region 110. The first uncoated region 110 and the current collector plate 300 may be coupled, for example, by laser welding. Laser welding may be performed by partially melting a base material of the current collector plate 300, or may be performed with a solder for welding being interposed between the current collector plate 300 and the first uncoated region 110. In this case, the solder preferably has a lower melting point compared to the current collector plate 300 and the first uncoated region 110.

The current collector plate 300 may be coupled to a coupling surface formed by bending the end of the first uncoated region 110 in a direction parallel to the current collector plate 300. The bent direction of the first uncoated region 110 may be, for example, a direction toward the winding center of the electrode assembly 100, namely a core. When the first uncoated region 110 has such a bent shape, the space occupied by the first uncoated region 110 may be reduced, thereby improving energy density. In addition, since the coupling area between the first uncoated region 110 and the current collector plate 300 increases, it is possible to bring about the effect of improving the coupling force and reducing the resistance.

The cell terminal 400 is made of a conductive metal, and is coupled to the through-hole 211 formed in the closed portion 210 of the battery can 200 and electrically connected to the current collector plate 300. Additionally, the cell terminal 400 is electrically connected to the first electrode plate of the electrode assembly 100 through the current collector plate 300 and accordingly has a positive polarity.

That is, the cell terminal 400 may act as a first electrode terminal or a positive electrode terminal. Additionally, the battery can 200 is electrically connected to the second electrode plate of the electrode assembly 100 as described above and accordingly has a negative polarity.

The cell terminal 400 may include a terminal insertion portion 410. The terminal insertion portion 410 may be inserted into the battery can 200 through the through-hole 211 formed in the closed portion 210 of the battery can 200, such that the lower end is electrically connected to the first uncoated region 110.

The terminal insertion portion 410 may be coupled to the current collector plate 300 or the first uncoated region 110 through both the battery can 200 and the insulator 600. The terminal insertion portion 410 may be fixed to the through-hole 211 by riveting toward the inner surface of the upper end of the battery can 200 with the lower edge pressed by a caulking jig.

That is, the lower peripheral end of the terminal insertion portion 410 may be curved toward the inner surface of the battery can 200 by the application of the caulking jig. To this end, the maximum width of the end of the terminal insertion portion 410 may be larger than the maximum width of the hole of the battery can 200 formed for the passing-through of the terminal insertion portion 410.

Meanwhile, in another embodiment, the terminal insertion portion 410 may not be curved toward the inner surface of the battery can 200. For example, referring to FIG. 8, the terminal insertion portion 410 may have an approximately cylindrical shape passing through the hole at approximately the center of the upper surface of the battery can 200.

In an embodiment of the present disclosure, the terminal insertion portion 410 may have a circular shape on plane, but is not limited thereto. The terminal insertion portion 410 may selectively have a polygonal shape, a star-like shape and a shape having legs extended from the center.

The terminal insertion portion 410 of the cell terminal 400 may pass through the center hole of the insulator 600. Additionally, the diameter of the center hole of the insulator 600 may be equal to or larger than the diameter of the terminal insertion portion 410. Additionally, the terminal insertion portion 410 of the cell terminal 400 may be electrically coupled to the current collector plate 300 through the center hole of the insulator 600.

Referring to FIG. 3, the cap plate 230 is configured to close the open portion 220 of the battery can 200. The cap plate 230 may be made of, for example, a metal to ensure stiffness.

The cap plate 230 closes the open portion 220 on the bottom of the battery can 200. The cap plate 230 may be separated from the electrode assembly 100 and may be nonpolar. That is, even in case that the cap plate 230 is made of a conductive metal, the cap plate 230 may be nonpolar. The nonpolar cap plate 230 represents that the cap plate 230 is electrically insulated from the battery can 200 and the cell terminal 400. The cap plate 230 may be polar or nonpolar, and its material is not necessarily limited to the conductive metal.

The cap plate 230 may be seated and supported on the beading portion 240 of the battery can 200. Additionally, the cap plate 230 is fixed by the crimping portion 250. The sealing gasket 260 may be interposed between the cap plate 230 and the crimping portion 250 of the battery can 200 to ensure sealability of the battery can 200. That is, the sealing gasket 260 may be interposed between the edge of the cap plate 230 and the open portion 220 of the battery can 200.

Meanwhile, the battery can 200 of the present disclosure may not include at least one of the beading portion 240 or the crimping portion 250, and in this case, the sealing gasket 260 may be interposed between the securing structure provided at the open portion 220 of the battery can 200 and the cap plate 230 to ensure sealability of the battery can 200.

The cap plate 230 may include a vent notch 231 designed to rupture when the internal pressure of the battery can 200 is higher than the threshold.

For example, the vent notch 231 may be formed on two surfaces of the cap plate 230, and may be formed in at least one of a continuous circular pattern, a discontinuous circular pattern or a linear pattern on the surface of the cap plate 230. Additionally, the vent notch 231 may be formed in a variety of different patterns.

The vent notch 231 may be formed on the bottom of the battery can 200 on the basis of the placement of the battery can 200, and when the vent notch 231 ruptures, gas in the battery can 200 may be discharged out through the bottom of the battery can 200.

For example, when the battery can 200 is positioned such that the cell terminal 400 is disposed at the upper part as shown in FIG. 3, the vent notch 231 may be formed on the bottom of the battery can 200 on the basis of FIG. 3.

The vent notch 231 may be an area having a smaller thickness than any other area of the cap plate 230.

Since the vent notch 231 is thinner than the surrounding area, the vent notch 231 may be more prone to rupture than the surrounding area, and when the internal pressure of the battery can 200 is equal to or higher than the predetermined level, the vent notch 231 may rupture to discharge out gas inside of the battery can 200.

For example, the vent notch 231 may be formed by partially reducing the thickness of the battery can 200 through notching on one or two surfaces of the cap plate 230.

The cylindrical battery cell 10 according to an embodiment of the present disclosure may have a structure in which positive and negative electrode terminals are arranged at the upper part, resulting in the more complex upper structure than the lower structure.

Accordingly, to smoothly discharge out gas inside of the battery can 200, the cap plate 230 that forms the lower surface of the cylindrical battery cell 10 may have the vent notch 231.

As described above, when gas inside of the battery can 200 provided in the cylindrical battery cell 10 is discharged out downwards, it may be good for the user's safety. For example, in case that the cylindrical battery cell 10 is positioned immediately below the driver's seat in an electric vehicle, when gas is discharged out upwards, there may be safety accident risks of the driver.

However, when gas is discharged out through the bottom of the battery can 200 as in the cylindrical battery cell 10 according to an embodiment of the present disclosure, the above-described problem does not occur in case that the cylindrical battery cell 10 is positioned immediately below the driver's seat in an electric vehicle.

Referring to FIG. 3, the lower end of the cap plate 230 is preferably disposed higher than the lower end of the battery can 200. In this case, even when the lower end of the battery can 200 contacts the ground or the bottom of a housing for forming a module or a pack, the cap plate 230 does not contact the ground or the bottom of the housing for forming a module or a pack.

Accordingly, it is possible to prevent a phenomenon in which the pressure required for the rupture of the vent notch 231 is different from the design pressure due to the weight of the cylindrical battery cell 10, thereby allowing for smooth rupture of the vent notch 231.

Referring to FIG. 3, the lower current collector plate 700 is coupled to the bottom of the electrode assembly 100. The lower current collector plate 700 is made of a conductive metal, for example, aluminum, steel, copper and nickel and is electrically connected to the second uncoated region 120 of the second electrode plate.

Preferably, the lower current collector plate 700 is electrically connected to the battery can 200. To this end, at least a part of the edge area of the lower current collector plate 700 may be interposed and fixed between the inner surface of the battery can 200 and the sealing gasket 260.

In an embodiment, at least a part of the edge area of the lower current collector plate 700 may be fixed to the beading portion 240 by welding while being supported on the lower end surface of the beading portion 240 formed at the lower end of the battery can 200. In a variation, at least a part of the edge area of the lower current collector plate 700 may be directly welded to the inner wall surface of the battery can 200.

Preferably, at least a part of the remaining area except the coupling area of the lower current collector plate 700 with the beading portion may be coupled to the bent surface of the second uncoated region 120 through welding, for example, laser welding.

For example, at least a part of the edge of the lower current collector plate 700 may be electrically coupled to the surface adjacent to the crimping portion 250 among the upper surface and the lower surface of the beading portion 240.

Meanwhile, the electrode assembly 100 according to an embodiment of the present disclosure may include the first electrode plate and the second electrode plate, the first electrode plate may include the first uncoated region 110, and the second electrode plate may include the second uncoated region 120. Additionally, at least a part of the first uncoated region 110 and/or the second uncoated region 120 may be divided into the plurality of segments, and the structure of the segments will be described below in detail.

Figure 9:
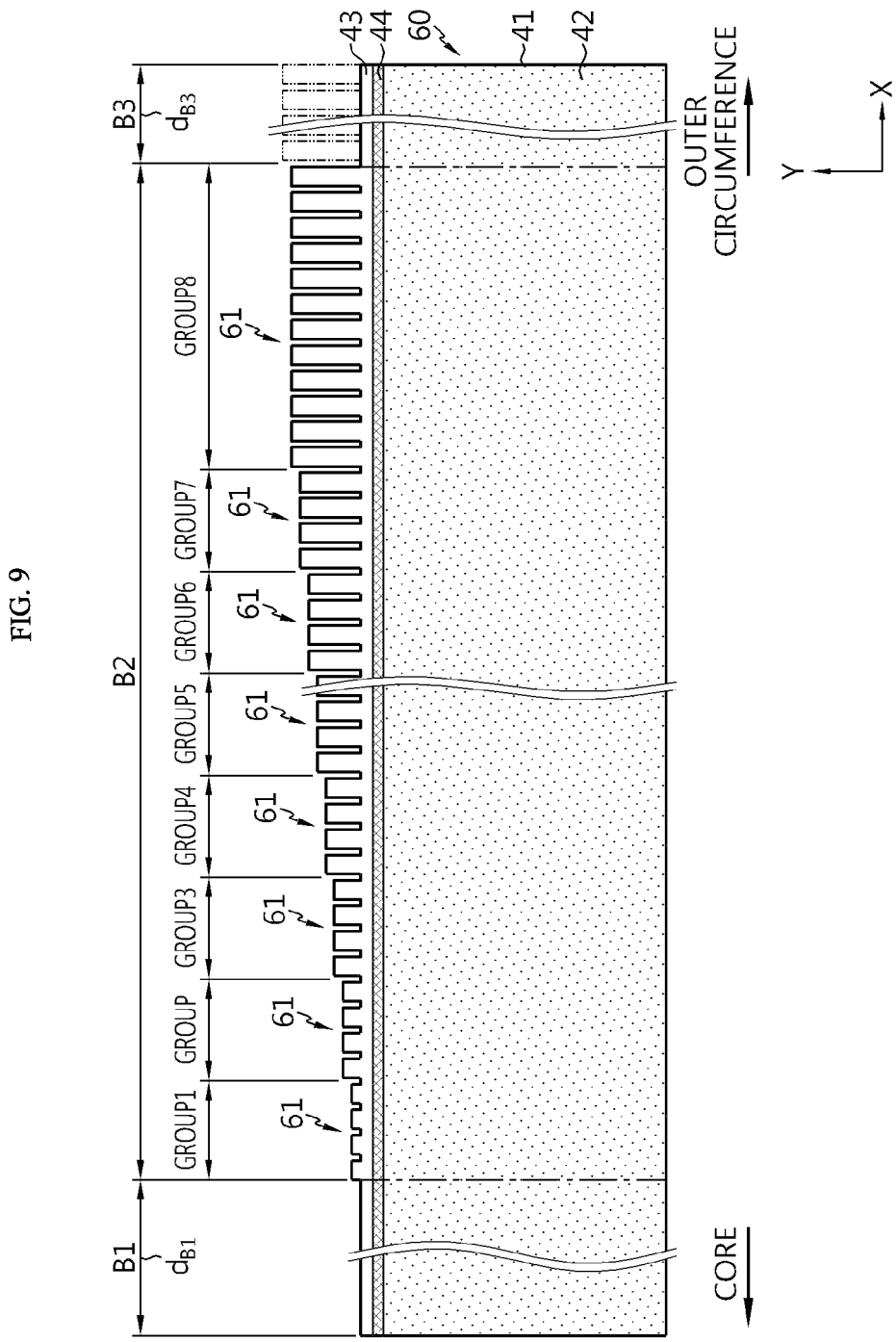
FIG. 9 is a plan view showing the structure of an electrode plate according to an embodiment of the present disclosure.

FIG. 9 is a plan view showing the structure of an electrode plate according to an embodiment of the present disclosure.

Referring to FIG. 9, in the uncoated region 43 of the electrode plate 60, the height of a core-side uncoated region B1 and an outer circumference-side uncoated region B3 is 0 or more, and is smaller than an intermediate uncoated region B2. Additionally, the height 0 of the core-side uncoated region B1 and the height of the outer circumference-side uncoated region B3 may be equal or different.

Preferably, at least a part of the intermediate uncoated region B2 may include the plurality of segments 61. The plurality of segments 61 may have a stepwise increase in height as it goes from the core to the outer circumference.

The segments 61 may be formed by laser notching. The segments 61 may be formed by the well-known metal film cutting process, for example, ultrasonic cutting or punching.

In FIG. 9, a predetermined gap is preferably formed between the lower end (C4 in FIG. 10) of the cutting line between the segments 61 and the active material layer 42 to prevent damage to the active material layer 42 and/or the insulation coating layer 44 when bending the uncoated region 43. It is because when the uncoated region 43 is bent, stress concentration occurs near the lower end of the cutting line. The gap is preferably 0.2 to 4 mm. When the gap is adjusted to the corresponding numerical range, it is possible to prevent the active material layer 42 and/or the insulation coating layer 44 near the lower end of the cutting line from being damaged by the stress occurring when bending the uncoated region 43. Additionally, the gap may prevent damage to the active material layer 42 and/or the insulation coating layer 44 caused by the clearance in the notching or cutting of the segments 61. Preferably, when the electrode plate 60 is wound, at least a part of the insulation coating layer 44 may be exposed through the separator. In this case, the insulation coating layer 44 may support the bending point when the segments 61 is bent.

The plurality of segments 61 may form a plurality of segment groups as it goes from the core to the outer circumference. At least one of the width, height or pitch of the segments in the same segment group may be substantially equal.

Figure 10:
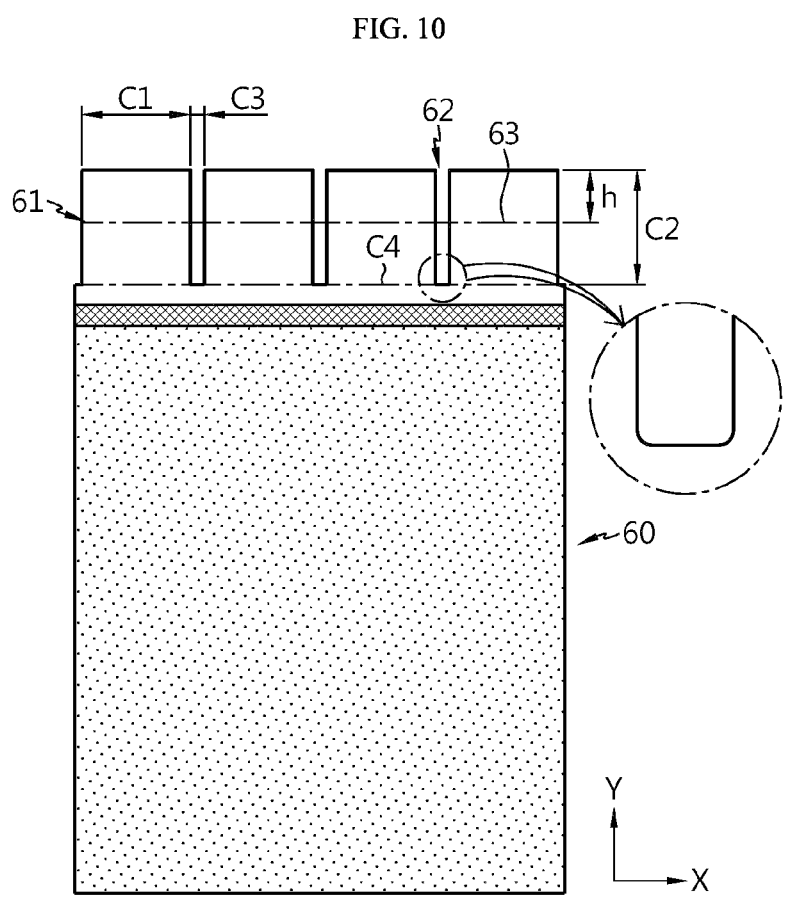

FIG. 10 is a diagram showing the definition of the width, height and pitch of the segments 61 according to an embodiment of the present disclosure.

Referring to FIG. 10, the width C1, height C2 and pitch C3 of the segments 61 are designed to prevent the tear of the uncoated region 43 when bending the uncoated region 43, and sufficiently increase the number of overlapping layers of the uncoated region 43 to improve the weld strength without abnormal deformation of the uncoated region 43. The abnormal deformation refers to irregular deformation occurring when the uncoated region below the bending point does not keep it linear any longer and is collapsing.

Preferably, the width C1 of the segments 61 may be adjusted in the range of 1 to 8 mm. When C1 is less than 1 mm, there is a non-overlapping area or an empty space (a gap) sufficient to ensure the weld strength when the segments 61 are bent toward the core. In contrast, when C1 is larger than 8 mm, there is a likelihood that the uncoated region 43 near the bending point may tear by the stress when the segments 61 are bent.

Additionally, the height of the segments 61 may be adjusted in the range of 2 to 10 mm. When C2 is less than 2 mm, there is a non-overlapping area or an empty space (a gap) sufficient to ensure the weld strength when the segments 61 are bent toward the core. In contrast, when C2 is larger than 10 mm, it is difficult to fabricate the electrode plate while uniformly maintaining the flatness of the uncoated region in the winding direction X. That is, the height of the uncoated region increases, causing a swell. Additionally, the pitch C3 of the segments 61 may be adjusted in the range of 0.05 to 1 mm. When C3 is less than 0.05 mm, the uncoated region 43 near the bending point may tear by the stress when the segments 61 are bent. In contrast, when C3 is larger than 1 mm, there is a non-overlapping area or an empty space (a gap) sufficient to ensure the weld strength when the segments 61 are bent.

Referring to FIG. 10, the cutout portion 62 is positioned between two adjacent segments 61 in the winding direction X. The cutout portion 62 corresponds to a space formed by removing the uncoated region 43. Preferably, the lower corner of the cutout portion 62 may have a round shape (see the partially enlarged diagram). The round shape may reduce the stress applied to the lower end of the cutout portion 62 when winding the electrode plate 60 and/or bending the segments 61.

Referring back to FIG. 9, the width $d_{B1}$ of the core-side uncoated region B1 is designed to meet the requirement that it is required not to cover the hollow of the electrode assembly core when bending the segments 61 of the intermediate uncoated region B2 toward the core.

In an example, the width $d_{B1}$ of the core-side uncoated region B1 may increase in proportion to the bend length of the segments 61 of Group 1. The bend length corresponds to the height of the segments 61 with respect to the bending point (63 in FIG. 10). Referring to FIG. 10, C4 denotes the lowest bendable point. The bending point may be appropriately set to a location indicated by C4 or higher than C4. The bend length is a length from the bending point to the top of the segments 61. Specifically, the bending point may be set to a predetermined point of the height C2 of the segments 61 with respect to C4. The predetermined point may be set to prevent mechanical damage to the active material layer 42 or the insulation coating layer 44 caused by the stress occurring when bending the segments 61, and ensure a sufficient number of overlapping layers in the radial direction when the segments 61 are bent in the radial direction of the electrode assembly, thereby ensuring sufficient weld strength when welding the current collector plate to the bent area of the segments 61.

In a specific example, when the electrode plate 60 is used to fabricate the electrode assembly of the cylindrical cell with 46800 form factor, the width $d_{B1}$ of the core-side uncoated region B1 may be set to 180 to 350 mm according to the diameter of the electrode assembly core.

In an embodiment, the width of each segment group may be designed to form the same winding turn of the electrode assembly.

Here, the winding turn may be counted based on the end of the core-side uncoated region B1 when the electrode plate 60 is wound.

In another variation, the width of each segment group may be designed to form at least one winding turn of the electrode assembly.

In still another variation, the width and/or height and/or pitch of the segments 61 in the same segment group may gradually and/or stepwise and/or irregularly increase or decrease in the group.

Groups 1 to 8 are just an example of the segment group. The number of groups, the number of segments 61 in each group and the width of the group may be preferably adjusted so that the segments 61 overlap in multiple layers to disperse the stress to the maximum and ensure sufficient weld strength in the bending process of the uncoated region 43.

In another variation, the height of the outer circumference-side uncoated region B3 may decrease gradually or stepwise.

In still another variation, the segmented structure of the intermediate uncoated region B2 may be extended to the outer circumference-side uncoated region B3 (see the dashed line). In this case, in the same way as the intermediate uncoated region B2, the outer circumference-side uncoated region B3 may include the plurality of segments. In this case, the width and/or height and/or pitch of the segments of the outer circumference-side uncoated region B3 may be larger than that of the segments of the intermediate uncoated region B2. Optionally, the segmented structure of the outer circumference-side uncoated region B3 may be the same as the outermost segment group of the intermediate uncoated region B2.

In a specific embodiment, when the electrode plate 60 is used to fabricate the electrode assembly of the cylindrical cell with 46800 form factor, the width $d_{B1}$ of the core-side uncoated region B1 may be 180 to 350 mm. The width of Group 1 may be 35 to 40% of the width of the core-side uncoated region B1. The width of Group 2 may be 130 to 150% of the width of Group 1. The width of Group 3 may be 120 to 135% of the width of Group 2. The width of Group 4 may be 85 to 90% of the width of Group 3. The width of Group 5 may be 120 to 130% of the width of Group 4. The width of Group 6 may be 100 to 120% of the width of Group 5. The width of Group 7 may be 90 to 120% of the width of Group 6. The width of Group 8 may be 115 to 130% of the width of Group 7. In the same way as the width of the core-side uncoated region B1, the width $d_{B3}$ of the outer circumference-side uncoated region B3 may be 180 to 350 mm.

The width of Groups 1 to 8 does not show a uniformly increasing or decreasing pattern because the width of the segments gradually increases as it goes from Group 1 to Group 8 but the number of segments in the group is limited to an integer. Accordingly, the number of segments in the specific segment group may decrease. Accordingly, as shown, the width of the group may show an irregular change as it goes from the core to the outer circumference.

That is, when the winding direction width of three segment groups that are consecutively adjacent in the circumferential direction of the electrode assembly is W1, W2 and W3, respectively, a combination of segment groups having W3/W2 that is smaller than W2/W1 may be included.

In the specific example, it is the same case with Groups 4 to 6. A width ratio of Group 5 to Group 4 is 120 to 130%, and a width ratio of Group 6 to Group 5 is 100 to 120% and its value is smaller than 120 to 130%.

Figure 11:
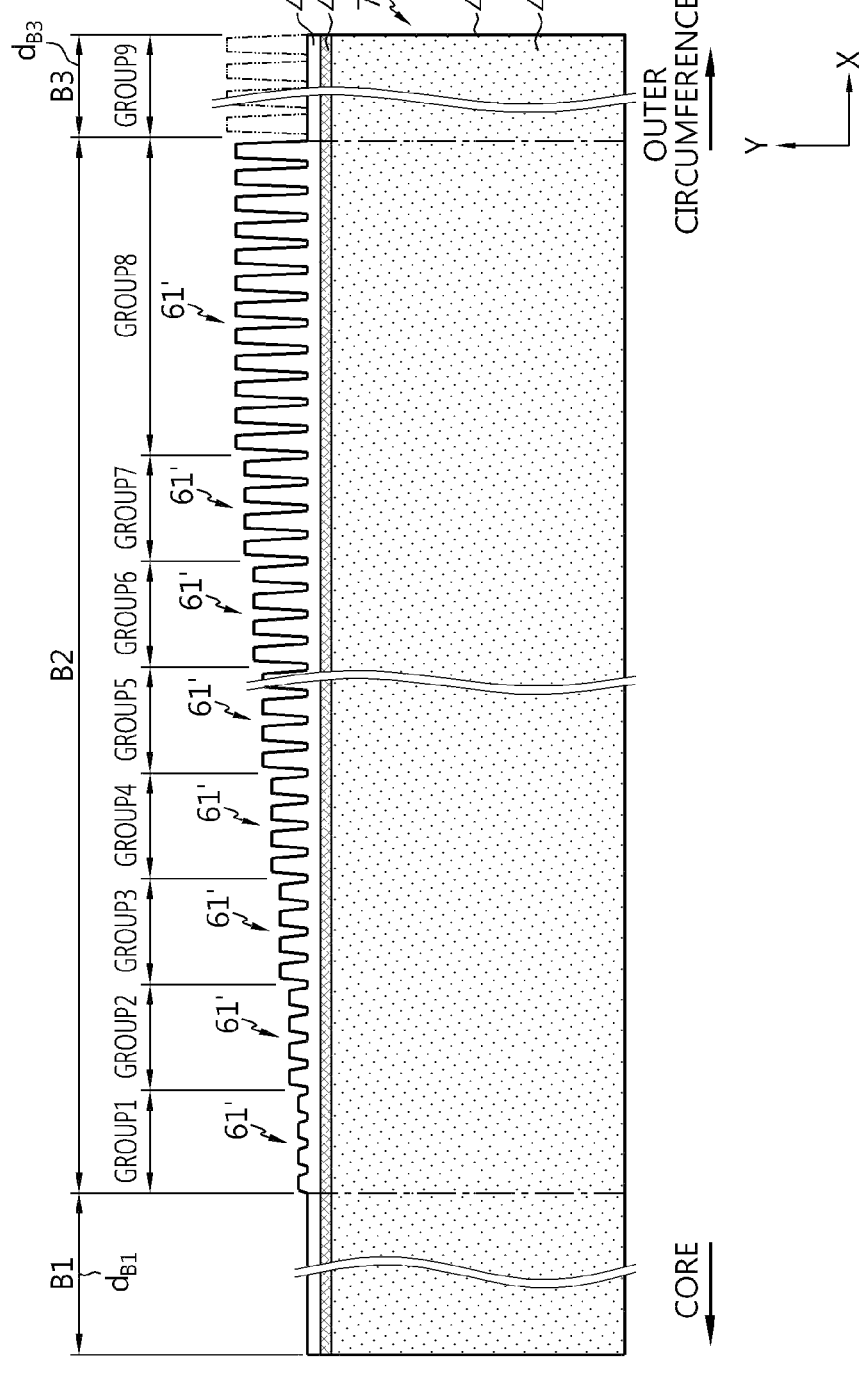
FIG. 11 is a plan view of unfolded view showing the structure of an electrode plate according to another embodiment of the present disclosure.
Figure 12:
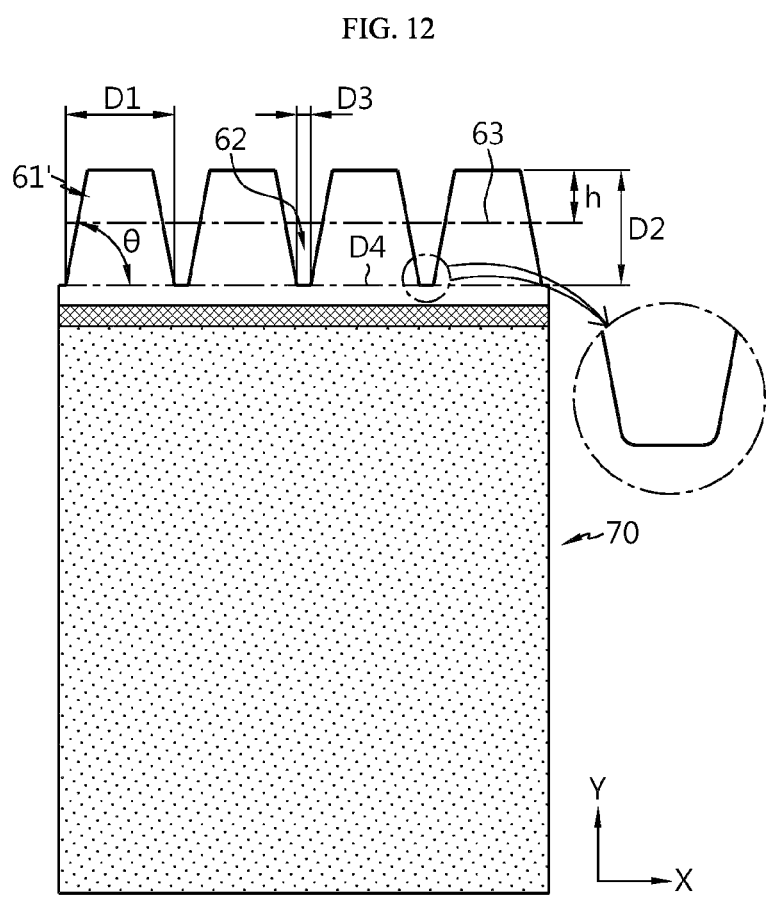

FIG. 11 is a plan view of unfolded view showing the structure of an electrode plate according to another embodiment of the present disclosure, and FIG. 12 is a diagram showing the definition of width, height and pitch of segments according to FIG. 11.

Referring to FIG. 11, the electrode plate 70 is substantially the same as FIG. 9 except the shape of the segments 61' is changed from the rectangular shape to the trapezoidal shape.

FIG. 12 shows the definition of the width, height and pitch of the trapezoidal segments 61'.

Referring to FIG. 12, the width D1, height D2 and pitch D3 of the segments 61' are designed to prevent the tear of the uncoated region 43 near the bending point when bending the uncoated region 43 and sufficiently increase the number of overlapping layers of the uncoated region 43 to ensure sufficient weld strength without abnormal deformation of the uncoated region 43.

Preferably, the width D1 of the segments 61' may be adjusted in the range of 1 to 8 mm. When D1 is less than 1 mm, there is a non-overlapping area or an empty space (a gap) sufficient to ensure the weld strength when the segments 61' are bent toward the core. In contrast, when D1 is larger than 8 mm, there is a likelihood that the uncoated region 43 near the bending point may tear by the stress when the segments 61 are bent. Additionally, the height of the segments 61' may be adjusted in the range of 2 to 10 mm. When D2 is less than 2 mm, there is a non-overlapping area or an empty space (a gap) sufficient to ensure the weld strength when the segments 61' are bent toward the core. In contrast, when D2 is larger than 10 mm, it is difficult to fabricate the electrode plate while uniformly maintaining the flatness of the uncoated region 43 in the winding direction. Additionally, the pitch D3 of the segments 61' may be adjusted in the range of 0.05 to 1 mm. When D3 is less than 0.05 mm, the uncoated region 43 near the bending point D4 may tear by the stress when the segments 61' are bent. In contrast, when D3 is larger than 1 mm, there is a non-overlapping area or an empty space (a gap) sufficient to ensure the weld strength when the segments 61' are bent.

The cutout portion 62 is positioned between two adjacent segments 61' in the winding direction X. The cutout portion 62 corresponds to a space formed by removing the uncoated region 43. Preferably, the lower corner of the cutout portion 62 may have a round shape (see partially enlarged section). The round shape may reduce the stress when the segments 61' are bent.

Referring to FIGS. 11 and 12, the plurality of segments 61' may increase in the interior bottom angle θ of the trapezoid as it goes from the core to the outer circumference. When the radius of the electrode plate 70 increases, the curvature increases. When the interior bottom angle θ of the segments 61' increases with the increasing radius of the electrode assembly, it is possible to reduce the stress occurring in the radial direction and circumferential direction when the segments 61' are bent. Additionally, with the increasing interior bottom angle θ, the overlap area with the inner segments 61' and the number of overlapping layers increase when the segments 61' are bent, thereby uniformly ensuring the weld strength in the radial direction and circumferential direction and forming the bent surface flatly.

In an example, in case that the electrode plate 70 is used to fabricate the electrode assembly of the cylindrical cell with 46800 form factor, when the radius of the electrode plate 70 increases from 4 mm to 22 mm, the interior angle of the segments 61' may increase stepwise in the range of 60° to 85°.

In a variation, in the same way as the first embodiment and the second embodiment, the height of the outer circumference-side uncoated region B3 may decrease gradually or stepwise. Additionally, the segmented structure of the intermediate uncoated region B2 may be extended to the outer circumference-side uncoated region B3 (see the dashed line). In this case, in the same way as the intermediate uncoated region B2, the outer circumference-side uncoated region B3 may include the plurality of segments. In this case, the width and/or height and/or pitch of the segments of the outer circumference-side uncoated region B3 may be larger than that of the segments of the intermediate uncoated region B2. Optionally, the segmented structure of the outer circumference-side uncoated region B3 may be substantially the same as the outermost segment group of the intermediate uncoated region B2.

In a specific embodiment, when the electrode plate 70 is used to fabricate the electrode assembly of the cylindrical cell with 46800 form factor, the width $d_{B1}$ of the core-side uncoated region B1 may be 180 to 350 mm. The width of Group 1 may be 35 to 40% of the width of the core-side uncoated region B1. The width of Group 2 may be 130 to 150% of the width of Group 1. The width of Group 3 may be 120 to 135% of the width of Group 2. The width of Group 4 may be 85 to 90% of the width of Group 3. The width of Group 5 may be 120 to 130% of the width of Group 4. The width of Group 6 may be 100 to 120% of the width of Group 5. The width of Group 7 may be 90 to 120% of the width of Group 6. The width of Group 8 may be 115 to 130% of the width of Group 7. In the same way as the width of the core-side uncoated region B1, the width $d_{B3}$ of the outer circumference-side uncoated region B3 may be 180 to 350 mm.

The width of Groups 1 to 8 does not show a uniformly increasing or decreasing pattern because the width of the segments gradually increases as it goes from Group 1 to Group 8 but the number of segments in the group is limited to an integer. Accordingly, the number of segments in the specific segment group may decrease. Accordingly, as shown, the width of the group may show an irregular change as it goes from the core to the outer circumference.

That is, when the winding direction width of three segment groups that are consecutively adjacent in the circumferential direction of the electrode assembly is W1, W2 and W3, respectively, a combination of segment groups having W3/W2 that is smaller than W2/W1 may be included.

In the specific example, it is the same case with Groups 4 to 6. A width ratio of Group 5 to Group 4 is 120 to 130%, and a width ratio of Group 6 to Group 5 is 100 to 120% and its value is smaller than 120 to 130%.

Figure 13:
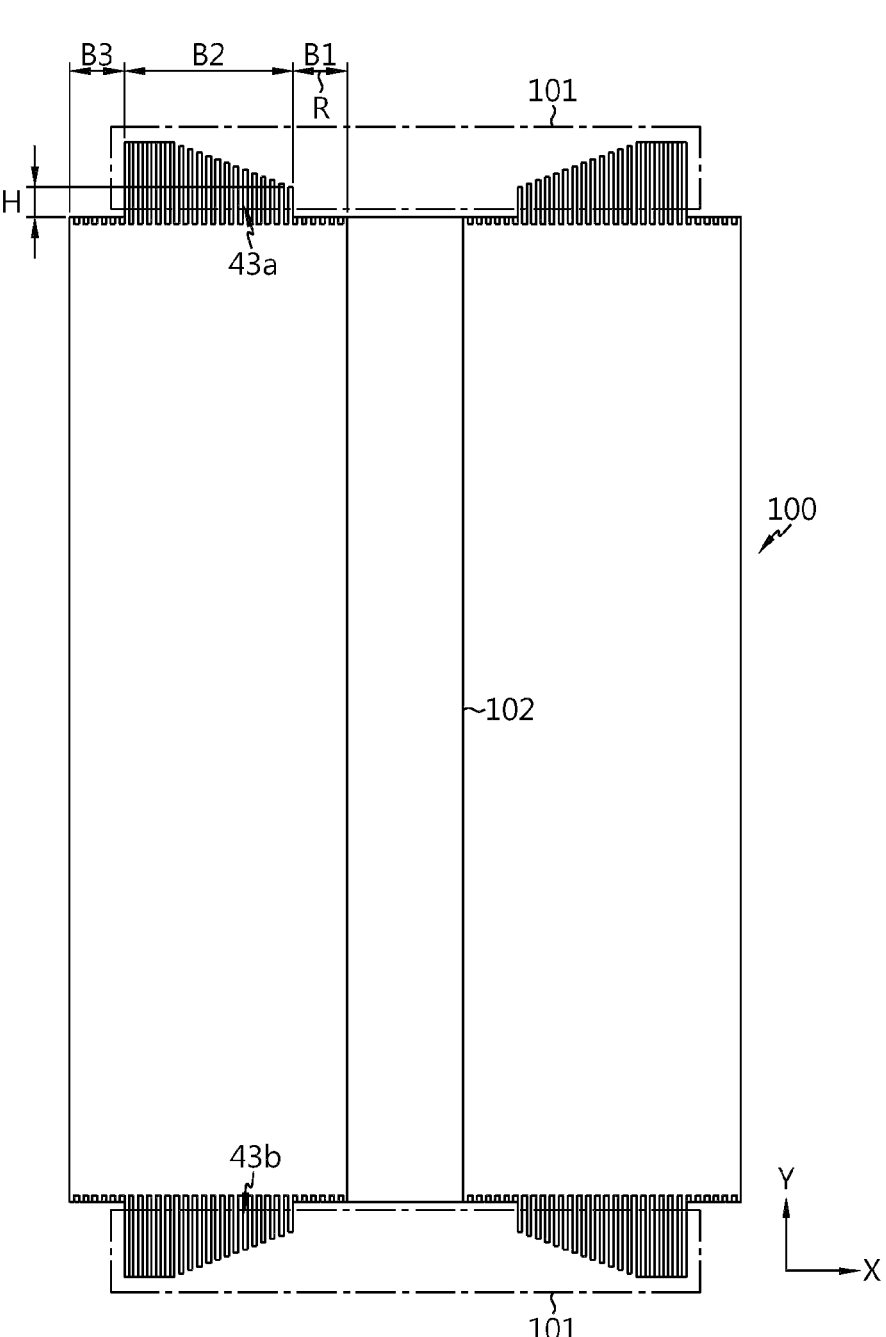
FIG. 13 is a cross-sectional view of an electrode assembly according to an embodiment of the present disclosure taken along a Y-axis direction (a winding axis direction).

FIG. 13 is a cross-sectional view of an electrode assembly according to an embodiment of the present disclosure taken along a Y-axis direction (a winding axis direction).

Referring to FIG. 13, the uncoated region 43a of the electrode plate includes the core-side uncoated region B1 adjacent to the core of the electrode assembly 100, the outer circumference-side uncoated region B3 adjacent to the outer circumferential surface of the electrode assembly 100, and the intermediate uncoated region B2 interposed between the core-side uncoated region B1 and the outer circumference-side uncoated region B3.

The height of the core-side uncoated region B1 is smaller than the height of the intermediate uncoated region B2. Additionally, in the intermediate uncoated region B2, the bend length of the uncoated region 43a disposed at the innermost side is equal to or smaller than the radial length R of the core-side uncoated region B1. The bend length H corresponds to the height of the uncoated region 43a with respect to the point (h in FIG. 10, h in FIG. 12) at which the uncoated region 43a is bent.

Accordingly, even when the intermediate uncoated region B2 is bent, the hollow 102 of the core of the electrode assembly 100 is not closed by the bent part. When the hollow 102 is not closed, it is possible to perform an electrolyte injection process with ease, thereby improving the electrolyte solution injection efficiency. Additionally, a welding process between the current collector plate of the negative electrode (or the positive electrode) and the battery can (or the rivet terminal) can be easily performed by inserting a welding jig through the hollow 102.

The height of the outer circumference-side uncoated region B3 is smaller than the height of the intermediate uncoated region B2. Accordingly, it is possible to prevent the contact between the beading portion and the outer circumference-side uncoated region B3 when the beading portion of the battery can is pressed near the outer circumference-side uncoated region B3.

In a variation, the height of the outer circumference-side uncoated region B3 may decrease gradually or stepwise as opposed to FIG. 13. Additionally, in FIG. 13, the height of a part of the intermediate uncoated region B2 near the outer circumference is equal, but the height of the intermediate uncoated region B2 may gradually or stepwise increase from the boundary between the core-side uncoated region B1 and the intermediate uncoated region B2 to the boundary between the intermediate uncoated region B2 and the outer circumference-side uncoated region B3.

The lower uncoated region 43b has the same structure as the upper uncoated region 43a. In a variation, the lower uncoated region 43b may have the conventional electrode plate structure or the electrode plate structures of the other embodiments (variations).

The end 101 of the upper uncoated region 43a and the lower uncoated region 43b may be bent from the outer circumference of the electrode assembly 100 to the core. In this instance, the core-side uncoated region B1 and the outer circumference-side uncoated region B3 are not substantially bent.

When the intermediate uncoated region B2 includes the plurality of segments, it is possible to reduce the bending stress, thereby preventing the tear or abnormal deformation of the uncoated region 43a near the bending point. Additionally, when the width and/or height and/or pitch of the segments is adjusted according to the numerical range of the above-described embodiment, as the segments are bent toward the core, the segments overlap into sufficient multiple layers to ensure the weld strength without forming an empty hole (a gap) in the bent surface (the surface viewed from the Y-axis).

Figure 14:
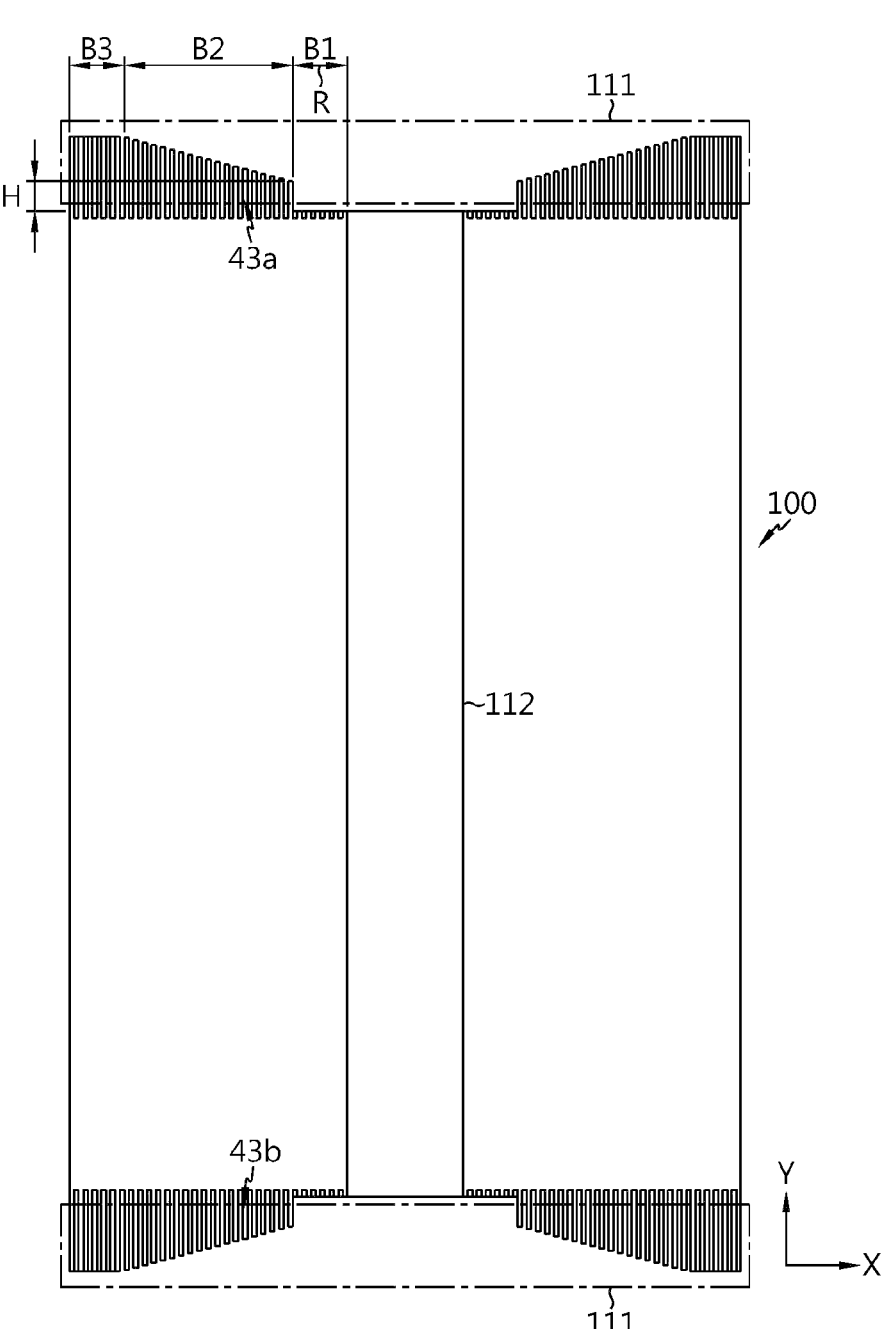
FIG. 14 is a cross-sectional view of an electrode assembly according to another embodiment of the present disclosure taken along a Y-axis direction (a winding axis direction).

FIG. 14 is a cross-sectional view of an electrode assembly according to another embodiment of the present disclosure taken along a Y-axis direction (a winding axis direction).

Referring to FIG. 14, the electrode assembly 100 is substantially the same as the electrode assembly 100 of FIG. 13 except that the height of the outer circumference-side uncoated region B3 is substantially equal to the height of the outermost side of the intermediate uncoated region B2. The outer circumference-side uncoated region B3 may include the plurality of segments.

In the electrode assembly 100, the height of the core-side uncoated region B1 is smaller than the height of the intermediate uncoated region B2. Additionally, in the intermediate uncoated region B2, the bend length H of the uncoated region disposed at the innermost side is equal to or smaller than the radial length R of the core-side uncoated region B1.

Accordingly, even when the intermediate uncoated region B2 is bent, the hollow 112 of the core of the electrode assembly 100 is not closed by the bent part. When the hollow 112 is not closed, it is possible to perform an electrolyte injection process with ease, thereby improving the electrolyte solution injection efficiency. Additionally, a welding process between the current collector plate of the negative electrode (or the positive electrode) and the battery can (or the rivet terminal) can be easily performed by inserting a welding jig through the hollow 112.

In a variation, the gradual or stepwise increase in height of the intermediate uncoated region B2 from the core to the outer circumference may be extended to the outer circumference-side uncoated region B3. In this case, the height of the uncoated region 43a may gradually or stepwise increase from the boundary between the core-side uncoated region B1 and the intermediate uncoated region B2 to the outermost surface of the electrode assembly 100.

The lower uncoated region 43b has the same structure as the upper uncoated region 43a. In a variation, the lower uncoated region 43b may have the conventional electrode plate structure or the electrode plate structures of the other embodiments (variations).

The end 111 of the upper uncoated region 43a and the lower uncoated region 43b may be bent from the outer circumference of the electrode assembly 100 to the core. In this instance, the core-side uncoated region B1 is not substantially bent.

When the intermediate uncoated region B2 and the outer circumference-side uncoated region B3 include the plurality of segments, it is possible to reduce the bending stress, thereby preventing the tear or abnormal deformation of the uncoated regions 43a, 43b near the bending point. Additionally, when the width and/or height and/or pitch of the segments is adjusted according to the numerical range of the above-described embodiment, as the segments are bent toward the core, the segments overlap into sufficient multiple layers to ensure the weld strength, without forming an empty hole (a gap) on the bent surface (the surface viewed from the Y-axis).

Figure 15:
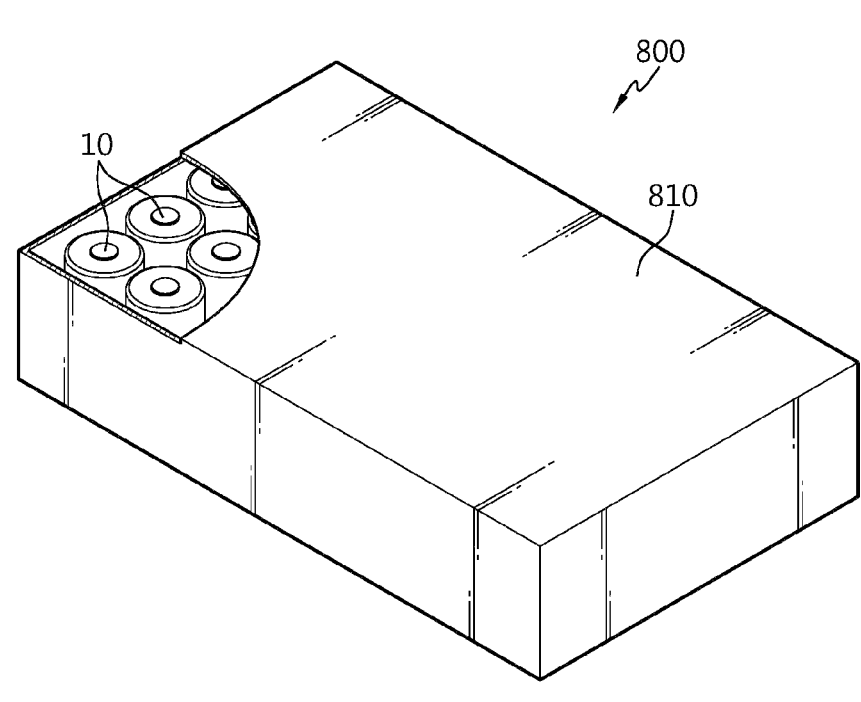
FIG. 15 is a diagram schematically showing the configuration of a battery pack according to an embodiment of the present disclosure.

FIG. 15 is a diagram schematically showing the configuration of a battery pack according to an embodiment of the present disclosure.

Referring to FIG. 15, the battery pack 800 according to an embodiment of the present disclosure includes an assembly of the cylindrical battery cells 10 electrically connected to each other and a pack housing 810 accommodating the assembly. The cylindrical battery cell 10 is the battery cell according to the above-described embodiment. In the drawings, for convenience of illustration, some components, for example, bus bars for electrical connection of the cylindrical battery cells 10, a cooling unit, an external terminal, or the like are omitted.

The battery pack 800 may be mounted in the vehicle 900. The vehicle 900 may be, for example, an electric vehicle, a hybrid electric vehicle or a plug-in hybrid electric vehicle. The vehicle 900 includes a four-wheeler or a two-wheeler.

Figure 16:
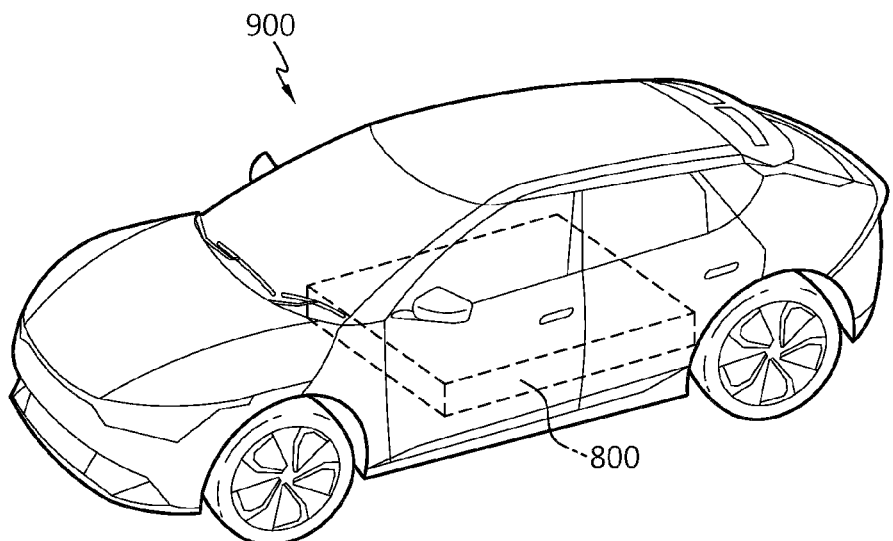
FIG. 16 is a diagram illustrating a vehicle comprising the battery pack of FIG. 15.

FIG. 16 is a diagram illustrating the vehicle comprising the battery pack of FIG. 15.

Referring to FIG. 16, the vehicle 900 according to an embodiment of the present disclosure includes the battery pack 800 according to an embodiment of the present disclosure. The vehicle 900 operates using the power supplied from the battery pack 800 according to an embodiment of the present disclosure.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A cylindrical battery cell, comprising:
an electrode assembly having a first electrode plate and a second electrode plate, each having a sheet shape, being wound in one direction with a separator being interposed therebetween, the first electrode plate including a first uncoated region in which an active material layer is not coated at an end of a long side of the first electrode plate, the first uncoated region forming a plurality of winding turns with respect to a center of the electrode assembly and being exposed to the outside of the separator to be used as an electrode tab by itself;
a battery can having an open portion in which the electrode assembly is accommodated therein and a partial closed portion provided at a side opposite the open portion, the battery can being electrically connected to the second electrode plate, the partial closed portion having a through-hole;
a current collector plate electrically connected to the first uncoated region of the first electrode plate and having a fusing portion that is configured to be cut off when an overcurrent flows; and
a cell terminal connected to the current collector plate through the through-hole of the closed portion of the battery can.

2. The cylindrical battery cell according to claim 1, wherein at least a part of a bottom surface of the cell terminal includes a flat portion parallel to an inner surface of the closed portion of the battery can, and the current collector plate is coupled to the flat portion of the cell terminal.

3. The cylindrical battery cell according to claim 1, wherein an end of the first uncoated region is bent to define a coupling surface, and
wherein the current collector plate is coupled to the coupling surface.

4. The cylindrical battery cell according to claim 1, wherein the electrode assembly includes a welding target area along a radial direction of the electrode assembly, and
    wherein the current collector plate is coupled to the first uncoated region within the welding target area.

5. The cylindrical battery cell according to claim 1, wherein the current collector plate includes:
    a rim portion disposed at an upper portion of the electrode assembly;
    an uncoated region coupling portion configured to extend inward from the rim portion and coupled to the first uncoated region;
    a terminal coupling portion spaced apart from the uncoated region coupling portion and coupled to the cell terminal; and
    a connection portion configured to extend inward from the rim portion and connected to the terminal coupling portion, the connection portion having the fusing portion,
    wherein the fusing portion has a large resistance compared to other regions under the condition that the same current flows.

6. The cylindrical battery cell according to claim 5, wherein the rim portion has a rim shape in which at least a part of an inner region is empty.

7. The cylindrical battery cell according to claim 5, wherein the uncoated region coupling portion and the terminal coupling portion are electrically connected by the rim portion.

8. The cylindrical battery cell according to claim 5, wherein the terminal coupling portion is located at a center of an inner space of the rim portion.

9. The cylindrical battery cell according to claim 5, wherein the terminal coupling portion has a diameter of 100% to 110% of a diameter of a hollow present in a core of the electrode assembly.

10. The cylindrical battery cell according to claim 5, wherein the fusing portion includes at least one notching groove in the connection portion.

11. The cylindrical battery cell according to claim 10, wherein the notching groove is located at an end surface in a width direction of the connection portion, an upper surface of the connection portion, or a lower surface of the connection portion.

12. The cylindrical battery cell according to claim 11, wherein the notching groove is recessed inward of the connection portion in a direction to decrease a width or thickness of the connection portion stepwise or continuously.

13. The cylindrical battery cell according to claim 12, wherein the fusing portion has a minimum width of 0.5 mm to 4.0 mm.

14. The cylindrical battery cell according to claim 5, wherein the fusing portion includes at least one through-hole in the connection portion.

15. The cylindrical battery cell according to claim 14, wherein the through-hole has a maximum width of 0.2 mm to 6 mm.

16. The cylindrical battery cell according to claim 5, wherein the fusing portion is surrounded by a tape.

17. The cylindrical battery cell according to claim 16, wherein the tape contains a polyimide (PI) material.

18. The cylindrical battery cell according to claim 5, wherein the fusing portion is located on the connection portion so as to be spaced apart from a center of the electrode assembly by a distance of 40% to 90% of a maximum radius thereof.

19. The cylindrical battery cell according to claim 1, wherein at least a part of the first uncoated region is divided into a plurality of segments along a winding direction of the electrode assembly.

20. The cylindrical battery cell according to claim 19, wherein at least a part of the plurality of segments is bent along a radial direction of the electrode assembly.

21. The cylindrical battery cell according to claim 20, wherein at least a part of the plurality of segments overlaps in multiple layers along the radial direction of the electrode assembly.

22. The cylindrical battery cell according to claim 20, wherein a remaining part of the plurality of segments are not bent, and
    wherein the fusing portion deviates from unbent segments among the plurality of segments and is positioned above bent segments among the plurality of segments.

23. The cylindrical battery cell according to claim 20, wherein a remaining part of the plurality of segments are cut, and
    wherein the fusing portion deviates from cut segments among the plurality of segments and is positioned above bent segments among the plurality of segments.

24. The cylindrical battery cell according to claim 5, wherein a welding pattern drawn by a welding bead on one surface of the terminal coupling portion of the current collector plate is drawn to surround a center of a bottom surface of the cell terminal.

25. The cylindrical battery cell according to claim 24, wherein the welding pattern is continuous or discontinuous.

26. The cylindrical battery cell according to claim 5, wherein a tensile force of a welding portion between the terminal coupling portion of the current collector plate and a bottom surface of the cell terminal is 2 kgf or more.

27. The cylindrical battery cell according to claim 26, wherein a converted diameter of the welding pattern drawn by the welding bead on one surface of the terminal coupling portion of the current collector plate is 2 mm or more.

28. The cylindrical battery cell according to claim 1, further comprising a cap plate configured to close the open portion of the battery can.

29. The cylindrical battery cell according to claim 28, wherein the cap plate is electrically separated from the electrode assembly and is nonpolar.

30. The cylindrical battery cell according to claim 28, wherein the cell terminal is coupled to the through-hole.

31. The cylindrical battery cell according to claim 30, further comprising an insulator interposed between the closed portion and the current collector plate.

32. The cylindrical battery cell according to claim 31, wherein the insulator includes an insulating polymer material.

33. The cylindrical battery cell according to claim 31, wherein the insulator is made of an elastic material.

34. The cylindrical battery cell according to claim 31, wherein the insulator has a center hole with a preset diameter at a center.

35. The cylindrical battery cell according to claim 31, wherein the insulator has a thickness corresponding to a distance between an inner surface of the closed portion of the battery can and the current collector plate.

36. The cylindrical battery cell according to claim 31, wherein an upper surface of the insulator is in contact with an inner surface of the closed portion of the battery can, and a lower surface of the insulator is in contact with an upper surface of the current collector plate.

37. The cylindrical battery cell according to claim 34, wherein the cell terminal includes a terminal insertion portion, and wherein the terminal insertion portion is inserted into the battery can through the through-hole.

38. The cylindrical battery cell according to claim 37, wherein the cell terminal is fixed to the through-hole while riveting a lower edge of the terminal insertion portion toward an inner surface of an upper end of the battery can.

39. The cylindrical battery cell according to claim 37, wherein a diameter of the center hole of the insulator is equal to or larger than a diameter of the terminal insertion portion.

40. The cylindrical battery cell according to claim 37, wherein the terminal insertion portion of the cell terminal passes through the center hole of the insulator.

41. The cylindrical battery cell according to claim 37, wherein the terminal insertion portion of the cell terminal is electrically coupled to the current collector plate through the center hole of the insulator.

42. The cylindrical battery cell according to claim 28, further comprising a sealing gasket between an edge of the cap plate and the open portion of the battery can, wherein the battery can includes a beading portion in a region adjacent to the open portion, and wherein the battery can includes a crimping portion extending and bent toward an inside of the battery can to surround and fix the edge of the cap plate together with the sealing gasket.

43. The cylindrical battery cell according to claim 42, wherein the crimping portion is located at a lower part of the battery can on a basis of placement of the battery can.

44. The cylindrical battery cell according to claim 28, wherein the cap plate includes a vent notch configured to rupture when an internal pressure of the battery can is higher than a threshold.

45. The cylindrical battery cell according to claim 44, wherein the vent notch is located on opposite surfaces of the cap plate, and is formed in at least one of a continuous circular pattern, a discontinuous circular pattern and a linear pattern on the surface of the cap plate.

46. The cylindrical battery cell according to claim 44, wherein the vent notch is located on a bottom of the battery can on a basis of placement of the battery can, and, when the vent notch ruptures, gas in the battery can is discharged through the bottom of the battery can.

47. The cylindrical battery cell according to claim 42, further comprising a lower current collector plate coupled to a bottom of the electrode assembly.

48. The cylindrical battery cell according to claim 47, wherein at least a part of an edge of the lower current collector plate is electrically coupled to the beading portion, and at least a part of a remaining area except the edge is electrically connected to a second uncoated region of the second electrode plate.

49. The cylindrical battery cell according to claim 48, wherein at least a part of the edge of the lower current collector plate is electrically coupled to a surface adjacent to the crimping portion among an upper surface and a lower surface of the beading portion.

50. The cylindrical battery cell according to claim 49, wherein the lower current collector plate and the beading portion are welded by a laser.

51. A battery pack, comprising at least one cylindrical battery cell according claim 1.

52. A vehicle, comprising at least one battery pack according to claim 51.

\* \* \* \* \*